(12) United States Patent
Baribault et al.

(10) Patent No.: US 11,543,533 B2
(45) Date of Patent: Jan. 3, 2023

(54) SYSTEMS AND METHODS FOR WIDE-ANGLE LIDAR USING NON-UNIFORM MAGNIFICATION OPTICS

(71) Applicant: LeddarTech Inc., Quebec (CA)

(72) Inventors: Robert Baribault, Quebec (CA); Pierre Olivier, Saint-Rédempteur (CA)

(73) Assignee: LeddarTech Inc., Quebec (CA)

( * ) Notice: Subject to any disclaimer, the term of this patent is extended or adjusted under 35 U.S.C. 154(b) by 0 days.

(21) Appl. No.: 17/705,854

(22) Filed: Mar. 28, 2022

(65) Prior Publication Data

US 2022/0244386 A1 Aug. 4, 2022

Related U.S. Application Data

(63) Continuation of application No. 17/382,144, filed on Jul. 21, 2021, now Pat. No. 11,402,510.

(60) Provisional application No. 63/054,634, filed on Jul. 21, 2020.

(51) Int. Cl.
| | |
|---|---|
| *G01C 3/08* | (2006.01) |
| *G01S 17/89* | (2020.01) |
| *G01B 11/22* | (2006.01) |
| *G01S 7/481* | (2006.01) |
| *G02B 27/00* | (2006.01) |
| *G02F 1/29* | (2006.01) |
| *G01S 17/931* | (2020.01) |

(52) U.S. Cl.
CPC .............. *G01S 17/89* (2013.01); *G01B 11/22* (2013.01); *G01S 7/4814* (2013.01); *G01S 7/4817* (2013.01); *G01S 17/931* (2020.01); *G02B 27/0081* (2013.01); *G02F 1/291* (2021.01); *G02F 2203/24* (2013.01)

(58) Field of Classification Search
None
See application file for complete search history.

(56) References Cited

U.S. PATENT DOCUMENTS

| | | |
|---|---|---|
| 3,045,231 A | 7/1962 | Emory |
| 3,954,335 A | 5/1976 | Bodlaj |
| 5,126,869 A | 6/1992 | Lipchak |
| (Continued) | | |

FOREIGN PATENT DOCUMENTS

| | | |
|---|---|---|
| CA | 2710212 | 7/2009 |
| CA | 2782180 | 6/2011 |
| (Continued) | | |

OTHER PUBLICATIONS

Atiq et al., "Vehicle Detection and Shape Recognition Using Optical Sensors: A Review", 2010 Second International Conference on Machine Learning and Computing, Feb. 11, 2010 (Nov. 2, 2010).

(Continued)

*Primary Examiner* — Mark Hellner
(74) *Attorney, Agent, or Firm* — Fish & Richardson P.C.

(57) ABSTRACT

Methods and systems for combining information from a first image captured of a scene via a first sensor and information from a second image captured of the scene via a second sensor wherein the first image and second image have at least one common field of view (FoV) and wherein the first image comprises pixels that are distributed according to a non-linear image point distribution function. The first image is corrected, before combining, based on said non-linear distribution function.

17 Claims, 39 Drawing Sheets

(56) References Cited

U.S. PATENT DOCUMENTS

| | | |
|---|---|---|
| 5,128,874 A | 7/1992 | Bhanu et al. |
| 5,195,144 A | 3/1993 | Parquier et al. |
| 5,198,657 A | 3/1993 | Trost et al. |
| 5,298,905 A | 3/1994 | Dahl |
| 5,396,510 A | 3/1995 | Wilson |
| 5,471,215 A | 11/1995 | Fukuhara |
| 5,565,870 A | 10/1996 | Fukuhara |
| 5,587,908 A | 12/1996 | Kajiwara |
| 5,633,901 A | 5/1997 | Bottman |
| 5,699,151 A | 12/1997 | Akasu |
| 5,745,806 A | 4/1998 | Saito |
| 5,812,249 A | 9/1998 | Johnson et al. |
| 5,831,717 A | 11/1998 | Ikebuchi |
| 5,852,491 A | 12/1998 | Kato |
| 5,870,178 A | 2/1999 | Egawa |
| 5,896,103 A | 4/1999 | Bunch |
| 5,923,417 A | 7/1999 | Leis |
| 5,933,225 A | 8/1999 | Yamabuchi |
| 5,987,395 A | 11/1999 | Donges |
| 6,100,539 A | 8/2000 | Blumcke |
| 6,115,112 A | 9/2000 | Hertzman |
| 6,115,114 A | 9/2000 | Berg et al. |
| 6,252,655 B1 | 6/2001 | Tanaka |
| 6,323,941 B1 | 11/2001 | Evans et al. |
| 6,502,053 B1 | 12/2002 | Hardin et al. |
| 6,522,393 B2 | 2/2003 | Higashino |
| 6,553,130 B1 | 4/2003 | Son et al. |
| 6,587,185 B1 | 7/2003 | Ide |
| 6,606,054 B2 | 8/2003 | Okamura |
| 6,650,403 B2 | 11/2003 | Ogawa |
| 6,657,704 B2 | 12/2003 | Shirai |
| 6,665,057 B2 | 12/2003 | Schellmann |
| 6,710,859 B2 | 3/2004 | Shirai |
| 6,765,495 B1 | 7/2004 | Dunning et al. |
| 6,829,043 B2 | 12/2004 | Lewis |
| 6,847,462 B1 | 1/2005 | Kacyra et al. |
| 6,850,156 B2 | 2/2005 | Bloomfield et al. |
| 6,897,465 B2 | 5/2005 | Remillard |
| 6,989,781 B2 | 1/2006 | Steinbuch |
| 7,023,531 B2 | 4/2006 | Gogolla |
| 7,068,214 B2 | 6/2006 | Kakishita |
| 7,177,014 B2 | 2/2007 | Mori |
| 7,221,271 B2 | 5/2007 | Reime |
| 7,350,945 B2 | 4/2008 | Albou et al. |
| 7,385,626 B2 | 6/2008 | Aggarwal et al. |
| 7,417,718 B2 | 8/2008 | Wada et al. |
| 7,508,496 B2 | 3/2009 | Mettenleiter et al. |
| 7,619,754 B2 | 11/2009 | Reil et al. |
| 7,852,461 B2 | 12/2010 | Yahav |
| 7,957,639 B2 | 6/2011 | Lee et al. |
| 7,957,900 B2 | 6/2011 | Chowdhary et al. |
| 8,045,249 B2 | 10/2011 | Kobayashi et al. |
| 8,189,051 B2 | 5/2012 | Shih et al. |
| 8,290,208 B2 | 10/2012 | Kurtz et al. |
| 8,446,492 B2 | 5/2013 | Nakano et al. |
| 8,457,827 B1 | 6/2013 | Ferguson et al. |
| 8,547,374 B1 | 10/2013 | Sadjadi et al. |
| 8,548,229 B2 | 10/2013 | Badino et al. |
| 8,587,686 B1 | 11/2013 | Riza et al. |
| 8,723,717 B2 | 5/2014 | Saito |
| 8,736,818 B2 | 5/2014 | Weimer |
| 8,761,594 B1 | 6/2014 | Gross et al. |
| 8,791,851 B2 | 7/2014 | Elad et al. |
| 8,908,159 B2 | 12/2014 | Mimeault |
| 8,982,313 B2 | 3/2015 | Escuti et al. |
| 8,996,224 B1 | 3/2015 | Herbach |
| 9,063,549 B1 | 6/2015 | Pennecot |
| 9,098,754 B1 | 8/2015 | Stout |
| 9,164,511 B1 | 10/2015 | Ferguson et al. |
| 9,188,980 B2 | 11/2015 | Anderson |
| 9,774,789 B2 | 9/2017 | Ciurea |
| 10,098,727 B1 | 10/2018 | Galstian |
| RE47,134 E | 11/2018 | Mimeault |
| 10,412,368 B2 | 9/2019 | Osterwood |
| 10,571,552 B1 | 2/2020 | Gao |
| 10,825,010 B2 | 11/2020 | Olmstead |
| 10,832,438 B2 | 11/2020 | Gozu |
| 10,884,278 B2 | 1/2021 | Hegyi |
| 11,022,857 B2 | 6/2021 | Lee |
| 11,061,406 B2 | 7/2021 | Mao |
| 11,087,494 B1 | 8/2021 | Srinivasan |
| 2001/0024271 A1 | 9/2001 | Takayanagi |
| 2001/0045981 A1 | 11/2001 | Gloger et al. |
| 2002/0097995 A1 | 7/2002 | Nakata |
| 2002/0141618 A1 | 10/2002 | Ciolli |
| 2003/0193642 A1 | 10/2003 | Tominaga et al. |
| 2004/0035620 A1 | 2/2004 | McKeeferey |
| 2004/0135992 A1 | 7/2004 | Munro |
| 2004/0164946 A1 | 8/2004 | Cavanaugh et al. |
| 2005/0117364 A1 | 6/2005 | Rennick et al. |
| 2005/0200832 A1 | 9/2005 | Kawai et al. |
| 2005/0269481 A1 | 12/2005 | David et al. |
| 2006/0072099 A1 | 4/2006 | Hoashi |
| 2006/0147089 A1 | 7/2006 | Han et al. |
| 2006/0149472 A1 | 7/2006 | Han et al. |
| 2006/0186702 A1 | 8/2006 | Kisanuki et al. |
| 2006/0274545 A1 | 12/2006 | Rosenstein |
| 2006/0274918 A1 | 12/2006 | Amantea et al. |
| 2007/0024841 A1 | 2/2007 | Kloza |
| 2007/0091294 A1 | 4/2007 | Hipp |
| 2007/0097349 A1 | 5/2007 | Wada |
| 2007/0165967 A1 | 7/2007 | Ando |
| 2007/0181810 A1 | 8/2007 | Tan |
| 2007/0187573 A1 | 8/2007 | Aoki |
| 2007/0189455 A1 | 8/2007 | Allison |
| 2007/0255525 A1 | 11/2007 | Lee |
| 2008/0046150 A1 | 2/2008 | Breed |
| 2008/0077327 A1 | 3/2008 | Harris |
| 2008/0199165 A1 | 8/2008 | Ng et al. |
| 2008/0297870 A1 | 12/2008 | Kobayashi et al. |
| 2009/0102699 A1 | 4/2009 | Behrens et al. |
| 2009/0109082 A1 | 4/2009 | Rose |
| 2009/0251680 A1 | 10/2009 | Farsaie |
| 2010/0014781 A1 | 1/2010 | Liu et al. |
| 2010/0040285 A1 | 2/2010 | Csurka et al. |
| 2010/0091263 A1 | 4/2010 | Kumagai |
| 2010/0157280 A1 | 6/2010 | Kusevic |
| 2010/0191117 A1 | 7/2010 | Kabakov |
| 2010/0204974 A1 | 8/2010 | Israelsen |
| 2010/0211247 A1 | 8/2010 | Sherony |
| 2010/0235129 A1 | 9/2010 | Sharma |
| 2010/0245535 A1 | 9/2010 | Mauchly |
| 2010/0315618 A1 | 12/2010 | Hertzman |
| 2011/0026008 A1 | 2/2011 | Gammenthaler |
| 2011/0081043 A1 | 4/2011 | Sabol |
| 2011/0134249 A1 | 6/2011 | Wood et al. |
| 2011/0141306 A1 | 6/2011 | Nakano et al. |
| 2011/0292406 A1 | 12/2011 | Hollenbeck et al. |
| 2012/0021595 A1 | 1/2012 | Kim |
| 2012/0026510 A1 | 2/2012 | Crampton et al. |
| 2012/0035788 A1 | 2/2012 | Trepagnier |
| 2012/0038902 A1 | 2/2012 | Dotson |
| 2012/0044093 A1* | 2/2012 | Pala ............... G01S 17/86 340/963 |
| 2012/0044476 A1 | 2/2012 | Earhart et al. |
| 2012/0148100 A1 | 6/2012 | Kotake et al. |
| 2012/0188467 A1 | 7/2012 | Escuti et al. |
| 2012/0206627 A1 | 8/2012 | Reschidko et al. |
| 2012/0229304 A1 | 9/2012 | Dalal |
| 2012/0214037 A1 | 12/2012 | Nehmadi |
| 2012/0310518 A1 | 12/2012 | Chen et al. |
| 2012/0326959 A1 | 12/2012 | Murthi et al. |
| 2013/0021595 A1 | 1/2013 | Guetta |
| 2013/0050430 A1 | 2/2013 | Lee |
| 2013/0107065 A1 | 5/2013 | Venkatraman et al. |
| 2013/0174102 A1 | 7/2013 | Leu |
| 2014/0077988 A1 | 3/2014 | Saito |
| 2014/0078263 A1 | 3/2014 | Kim |
| 2014/0094307 A1 | 4/2014 | Doolittle et al. |
| 2014/0118716 A1 | 5/2014 | Kaganovich |
| 2014/0132722 A1 | 5/2014 | Bauza et al. |
| 2014/0139639 A1 | 5/2014 | Wagner et al. |
| 2014/0240464 A1 | 8/2014 | Lee |
| 2014/0267631 A1 | 9/2014 | Powers |

(56) References Cited

U.S. PATENT DOCUMENTS

| | | | |
|---|---|---|---|
| 2014/0280230 A1 | 9/2014 | Masato et al. | |
| 2014/0358429 A1 | 12/2014 | Shutko | |
| 2015/0071541 A1 | 3/2015 | Qutub et al. | |
| 2015/0285912 A1 | 10/2015 | Hammes | |
| 2015/0310273 A1 | 10/2015 | Shreve | |
| 2015/0340875 A1 | 11/2015 | Prasad et al. | |
| 2015/0356357 A1 | 12/2015 | McManus et al. | |
| 2015/0362587 A1 | 12/2015 | Rogan | |
| 2015/0379766 A1 | 12/2015 | Newman | |
| 2016/0018526 A1 | 1/2016 | Van Den Bossche | |
| 2016/0047903 A1 | 2/2016 | Dussan | |
| 2016/0104289 A1 | 4/2016 | Chang | |
| 2016/0144695 A1 | 5/2016 | Higgins | |
| 2016/0180530 A1 | 6/2016 | Friend | |
| 2016/0214607 A1 | 7/2016 | Dolgov et al. | |
| 2016/0295196 A1 | 10/2016 | Finn | |
| 2017/0003392 A1 | 1/2017 | Bartlett et al. | |
| 2017/0124781 A1 | 5/2017 | Douillard | |
| 2017/0160600 A1 | 6/2017 | Galstian et al. | |
| 2017/0246990 A1 | 8/2017 | Rosenblum | |
| 2017/0269198 A1 | 9/2017 | Hall et al. | |
| 2017/0328990 A1 | 11/2017 | Magee et al. | |
| 2017/0371227 A1 | 12/2017 | Skirlo et al. | |
| 2018/0081037 A1 | 3/2018 | Medina | |
| 2018/0113200 A1 | 4/2018 | Steinberg et al. | |
| 2018/0114388 A1 | 4/2018 | Nagler | |
| 2018/0136321 A1 | 5/2018 | Verghese | |
| 2018/0136540 A1 | 5/2018 | Park | |
| 2018/0188359 A1 | 7/2018 | Droz | |
| 2018/0189977 A1 | 7/2018 | Zecchini | |
| 2018/0284286 A1 | 10/2018 | Eichenholz et al. | |
| 2018/0293445 A1 | 10/2018 | Gao | |
| 2018/0364334 A1* | 12/2018 | Xiang | G01S 17/931 |
| 2019/0011541 A1 | 1/2019 | O'Keeffe | |
| 2019/0025427 A1 | 1/2019 | O'Keeffe | |
| 2019/0075281 A1 | 3/2019 | Hall | |
| 2019/0121191 A1 | 4/2019 | Hegyi | |
| 2019/0176844 A1 | 6/2019 | Sedlmayr | |
| 2019/0219675 A1 | 7/2019 | Yoon | |
| 2019/0219681 A1 | 7/2019 | Atshushi | |
| 2019/0227175 A1 | 7/2019 | Steinberg | |
| 2019/0271767 A1 | 9/2019 | Keilaf | |
| 2019/0317217 A1 | 10/2019 | Day et al. | |
| 2019/0318177 A1 | 10/2019 | Steinberg | |
| 2019/0353784 A1 | 11/2019 | Toledano | |
| 2020/0013181 A1 | 1/2020 | Uyeno | |
| 2020/0033454 A1 | 1/2020 | Hong et al. | |
| 2020/0072950 A1 | 3/2020 | Phillip | |
| 2020/0099824 A1 | 3/2020 | Benemann | |
| 2020/0099872 A1 | 3/2020 | Benemann | |
| 2020/0284883 A1 | 9/2020 | Ferreira | |
| 2020/0353939 A1 | 11/2020 | Meng | |
| 2021/0003711 A1 | 1/2021 | Vandenberg | |
| 2021/0025997 A1 | 1/2021 | Rosenzweig | |
| 2021/0041712 A1 | 2/2021 | Bilik et al. | |
| 2021/0063841 A1 | 3/2021 | Yuan | |
| 2021/0080575 A1 | 3/2021 | Nehmadi | |
| 2021/0124367 A1 | 4/2021 | Lim | |
| 2021/0129868 A1 | 5/2021 | Nehmadi | |
| 2021/0190958 A1 | 6/2021 | Nonaka | |
| 2021/0208263 A1* | 7/2021 | Sutavani | G01S 7/4972 |
| 2021/0255637 A1 | 8/2021 | Kale | |
| 2021/0293931 A1 | 9/2021 | Nemet | |
| 2022/0026539 A1 | 1/2022 | Bernier | |
| 2022/0026540 A1 | 1/2022 | Olivier | |
| 2022/0026573 A1 | 1/2022 | Baribault | |
| 2022/0026576 A1 | 1/2022 | Baribault | |

FOREIGN PATENT DOCUMENTS

| | | | | |
|---|---|---|---|---|
| CN | 106462949 A | * | 2/2017 | G01S 17/08 |
| DE | 3535391 | | 5/1990 | |
| DE | 10361869 | | 7/2005 | |
| DE | 102019132239 | | 6/2021 | |
| EP | 2204670 | | 6/2014 | |
| JP | H04172285 | | 6/1992 | |
| JP | 912723 | | 5/1997 | |
| JP | 2005170184 | | 6/2005 | |
| JP | 2006521536 | | 9/2006 | |
| JP | 2007121116 | | 5/2007 | |
| JP | 09178786 | | 8/2009 | |
| JP | 09222476 | | 10/2009 | |
| JP | 2010091378 | | 4/2010 | |
| JP | 2010529932 | | 9/2010 | |
| JP | 2010286307 | | 12/2010 | |
| JP | 11101637 | | 5/2011 | |
| WO | WO1991007672 | | 5/1991 | |
| WO | WO2000012960 | | 3/2000 | |
| WO | WO2005008271 | | 1/2005 | |
| WO | WO2008017316 | | 2/2008 | |
| WO | WO2008070319 | | 6/2008 | |
| WO | WO2011014743 | | 2/2011 | |
| WO | WO2011077400 | | 6/2011 | |
| WO | WO2018055449 | | 3/2018 | |
| WO | WO2019106429 | | 6/2019 | |
| WO | WO2019197894 | | 10/2019 | |

OTHER PUBLICATIONS

Baig et al., "Fusion Between Laser and Stereo Vision Data For Moving Objects Tracking in Intersection Like Scenario", Fusion Between IV'2011—IEEE Intelligent Vehicles Symposium, Jun. 2011, Baden-Baden, Germany. pp. 262-367, ff10.1109/IVS.2011.5940576ff.

Braun et al., "Nanosecond transient electroluminescence from polymer light emitting diodes", Applied Physics Letters, vol. 61(26):3092-3094 (Dec. 1992).

CA Requisition in Canadian Appln. No. 3125618, dated Oct. 15, 2021, 4 pages.

CA Requisition in Canadian Appln. No. 3125623, dated Nov. 1, 2021, 4 pages.

CA Requisition in Canadian Appln. No. 3125716, dated Oct. 18, 2021, 4 pages.

CA Requisition in Canadian Appln. No. 3125718, dated Nov. 25, 2021, 3 pages.

Canadian Examiners Report in CA Appln. No. 2865733, dated May 31, 2021, 3 pages.

English translation of the Notification of Reasons for Rejection issued in Japanese Patent Application No. 2018077339, dated Mar. 25, 2019, 8 pages.

EP Search Report in EP Appln. No. 16774190.9, dated Jan. 28, 2019.

Escuti, Michael J. and W. Michael Jones, "Polarization-Independent Switching With High Contrast From A Liquid Crystal Polarization Grating", Society for Information Display, 2006.

Final Office Action dated Apr. 18, 2018 in connection with U.S. Appl. No. 15/373,189, 9 pages.

International Preliminary Report on Patentability in International Application No. PCT/IB2013/051667, dated Sep. 2, 2014, 6 pages.

International Search Report and Written Opinion for PCT/US2016/025252, Moscow, Russia, dated Aug. 11, 2016.

International Search Report and Written Opinion in International Application No. PCT/IB2013/051667, dated Jul. 9, 2013, 8 pages.

Kim et al., "Wide-Angle, Nonmechanical Beam Steering Using Thin Liquid Crystal Polarization Gratings", Advanced Wavefront Control: Methods, Devices and Applicatinos VI, 2008, 7093:709302-1-12.

Non-Final Office Action dated Oct. 31, 2017 in connection with U.S. Appl. No. 15/373,189, 31 pages.

Notice of Allowance dated Jul. 13, 2018 in connection with U.S. Appl. No. 15/373,189 (13 pages).

Notice of Allowance dated Mar. 8, 2018 in connection with U.S. Appl. No. 14/984,704, (8 pages).

Office Action in U.S. Appl. No. 17/382,144, dated Nov. 19, 2021, 17 pages.

Office Action in U.S. Appl. No. 17/382,155, dated Dec. 24, 2021, 23 pages.

(56) References Cited

OTHER PUBLICATIONS

Office Action in U.S. Appl. No. 17/382,163, dated Jan. 13, 2022, 31 pages.
Office Action in U.S. Appl. No. 17/382,177, dated Dec. 21, 2021, 25 pages.
Office Action dated Jun. 15, 2017 in connection with U.S. Appl. No. 14/984,704, (13 pages); and.
Office Action dated Oct. 9, 2019 in connection with U.S. Appl. No. 16/011,820 (25 pages).
Office Action dated Sep. 17, 2019 in connection with U.S. Appl. No. 15/867,995 (38 pages).
PCT International Preliminary Report on Patentability in International Appln. No. PCT/IL2018/050102, dated Aug. 6, 2019, 10 pages.
PCT International Search Report and Written Opinion in International Appln. No. PCT/CA2021/051010, dated Oct. 4, 2021, 18 pages.
PCT International Search Report and Written Opinion in International Appln. No. PCT/CA2021/051011, dated Oct. 6, 2021, 15 pages.
PCT International Search Report and Written Opinion in International Appln. No. PCT/CA2021/051012, dated Nov. 2, 2021, 11 pages.
PCT International Search Report and Written Opinion in International Appln. No. PCT/CA2021/051013, dated Oct. 21, 2021, 21 pages.
PCT International Search Report and Written Opinion in International Appln. No. PCT/IL2018/50102, dated Aug. 8, 2018, 14 pages.
Petrovskaya et al., "Awareness of Road Scene Participants for Autonomous Driving", Stanford University (USA), INRIA (France), Coimbra University (Portugal), University of Frieburg (Germany), University of Oxford (UK), Ohio Northern University (USA), Oct. 12, 2011.
Supplemental Notice of Allowability dated Sep. 12, 2018 in connection with U.S. Appl. No. 15/373,189 (4 pages).

\* cited by examiner

| Angles in configuration | | | |
|---|---|---|---|
| 0.0 | 4.6 | 15.0 | 40.0 |
| 0.5 | 5.5 | 17.0 | 45.0 |
| 1.0 | 6.4 | 19.3 | 50.6 |
| 1.5 | 7.5 | 21.9 | 56.9 |
| 2.0 | 8.7 | 24.8 | 63.8 |
| 2.5 | 10.0 | 28.0 | 71.6 |
| 3.2 | 11.5 | 31.6 | 80.3 |
| 3.8 | 13.1 | 35.6 | 90.0 |

Table 1 - Angles

| Distance to ground or max range (LIDAR height 3.5m) | | | |
|---|---|---|---|
| 75.0 | 43.6 | 12.0 | 5.4 |
| 75.0 | 36.8 | 10.6 | 4.9 |
| 75.0 | 31.4 | 9.4 | 4.5 |
| 75.0 | 26.9 | 8.4 | 4.2 |
| 75.0 | 23.3 | 7.5 | 3.9 |
| 75.0 | 20.2 | 6.7 | 3.7 |
| 63.5 | 17.6 | 6.0 | 3.6 |
| 52.3 | 15.4 | 5.4 | 3.5 |

Table 2 – Geometric distance at LiDAR height of 3.5m

| Distance to ground or max range (LIDAR height 2.5m) | | | |
|---|---|---|---|
| 75.0 | 31.2 | 8.5 | 3.9 |
| 75.0 | 26.3 | 7.6 | 3.5 |
| 75.0 | 22.4 | 6.7 | 3.2 |
| 75.0 | 19.2 | 6.0 | 3.0 |
| 71.6 | 16.6 | 5.3 | 2.8 |
| 56.3 | 14.4 | 4.8 | 2.6 |
| 45.4 | 12.6 | 4.3 | 2.5 |
| 37.3 | 11.0 | 3.9 | 2.5 |

Table 3 – Geometric distance at LiDAR height of 2.5m

FIG. 17

SYSTEMS AND METHODS FOR WIDE-ANGLE LIDAR USING NON-UNIFORM MAGNIFICATION OPTICS

CROSS-REFERENCE TO RELATED APPLICATIONS

This application is a continuation application of and claims the benefit of priority under 35 U.S.C. § 120 to U.S. application Ser. No. 17/382,144, filed on Jul. 21, 2021, which claims the benefit of U.S. Provisional Application No. 63/054,634, filed on Jul. 21, 2020, the contents of which are hereby incorporated by reference.

FIELD

This disclosure relates generally to LiDAR systems and methods of operation and, in particular, to a method for operating a LiDAR system across a wide-angle field-of-view.

BACKGROUND

LiDAR systems can be used in various applications, such as in vehicles, portable computer devices (e.g., smartphones, laptops, tablets) and augmented/virtual reality devices/systems, in order to image a field of view and locate objects within the field of view. A LiDAR system directs light outward over a range of angles and receives reflections of the light from objects. Many current LiDAR systems use a mechanical-scanning device, such as a gimbal or spinning disks or polygons in order to disperse outgoing light beams. However, such mechanical-scanning devices often come with resolution issues, maintenance issues, assembly issues and/or temperature dependence issues.

For these and other reasons, there is a need to improve manufacturability, performance and use of LiDAR systems in aspects such as range, resolution, field-of-view, and physical and environmental robustness.

BRIEF DESCRIPTION OF DRAWINGS

A detailed description of embodiments is provided below, by way of example only, with reference to drawings accompanying this description, in which:

FIG. 17 shows tables of examples of non-uniform steering angle configurations and corresponding geometric distances at heights of 2.5 m and 3.5 m for the LiDAR system of FIG. 7C.

It is to be expressly understood that the description and drawings are only for purposes of illustrating certain embodiments and are an aid for understanding. They are not intended to be and should not be limiting.

DETAILED DESCRIPTION OF EMBODIMENTS

LiDAR Systems

Radiation with wavelength in the optical region of the electromagnetic spectrum i.e., from the ultraviolet up to the infrared, can interact with matter in various states through mechanisms such as optical absorption and scattering. Early after the advent of the first lasers, it was recognized that these novel sources of coherent optical radiation could be used for sensing solid objects, particulate matter, aerosols, and even molecular species located at long distances. Remote sensing applications emerged owing to some distinctive features of laser sources. For example, several types of laser sources emit optical pulses carrying high energy that can propagate in the atmosphere in the form of a slowly-diverging optical beam. Similarly to the radio and microwave radiation sources used in common radar instruments, systems that employ light sources for remote sensing applications are generally known as LiDAR systems, or simply LiDARs, which is the acronym for Light Detection And Ranging.

Figure 1:
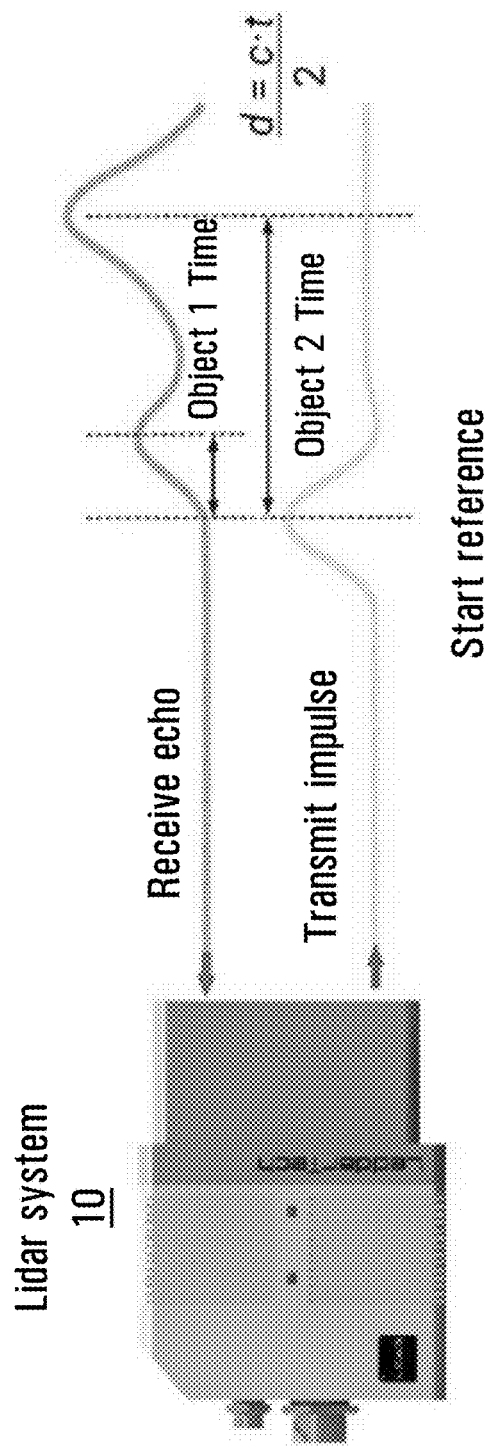
FIG. 1 shows an example of a LiDAR system transmitting an optical impulse into a field of view and determining range of objects based on time of flight of echoes reflected back from the objects within the field of view.
Figure 1:
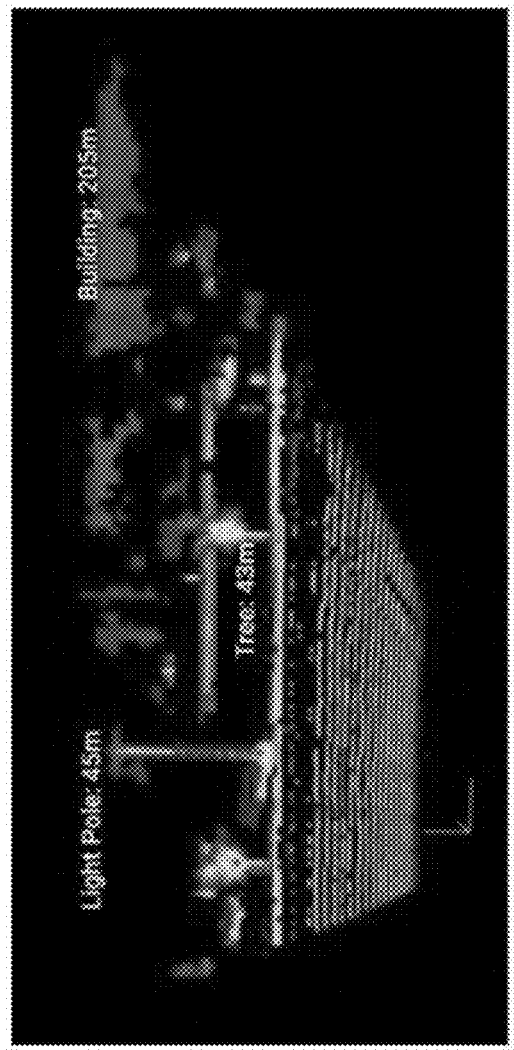

LiDAR works much like radar, emitting optical light pulses (e.g., infrared light pulses) of short duration, typically in the ns (nanosecond, $1\text{ ns}=10^{-9}$ s) range, either in single-shot regime or in the form of a pulse train of limited duration, instead of radio waves and measuring how long they take to come back after hitting nearby objects. This is shown conceptually in FIG. 1, which shows a Lidar system 10 transmitting an output laser pulse and receiving echoes from two objects. The time between the output laser pulse and the reflected pulses allows the LiDAR sensor to calculate the distance to each object precisely, based on the speed of light. For example, the range R of an object may be deduced from the measured full round-trip time T of the optical pulse using the simple relation:

$$R = \frac{cT}{2n},$$

where c is the speed of light in vacuum, which scales to roughly $3\times10^8$ m/s, and n denotes the refractive index of the medium in which the optical pulse propagates. Methods for optical ranging are not limited to the pulsed TOF technique. Methods such as optical triangulation, interferometric phase-shift range finding, and frequency-modulated continuous-wave (FMCW) range finding, just to name of few, exist as well. The review paper of M.-C. Amann et al. ("Laser ranging: a critical review of usual techniques for distance measurement", Optical Engineering vol. 40, pp. 10-19, January 2001) discusses these techniques in greater details.

LiDAR systems may be capable of capturing millions of such precise distance measurement points each second, from which a 3D matrix of its environment can be produced. Information on objects' position, shape, and behavior can be obtained from this comprehensive mapping of the environment, as shown in the example mapping shown in FIG. 1.

General Overview of a LiDAR System

Figure 2:
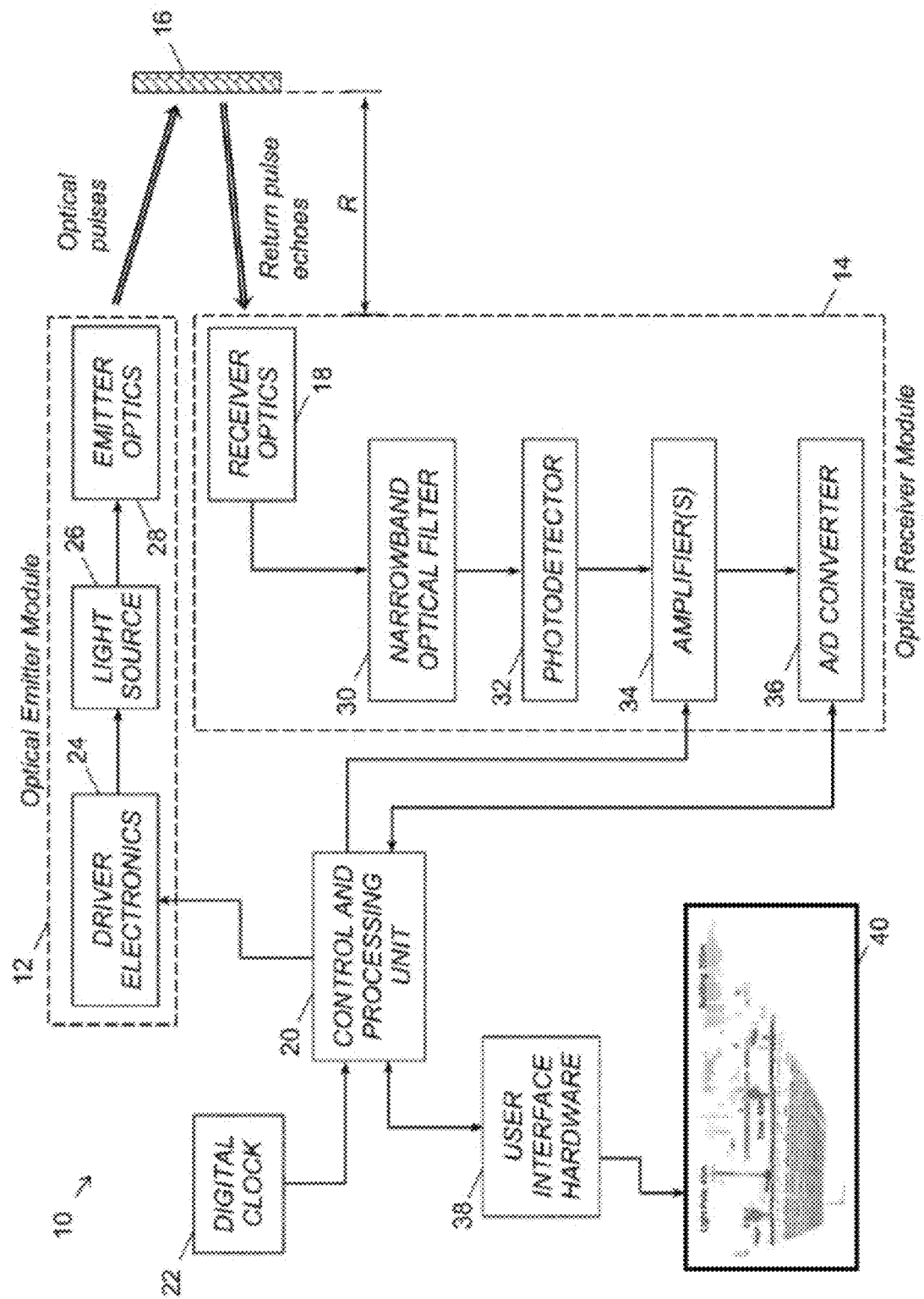
FIG. 2 shows examples of basic LiDAR system components for detection and ranging.

The various embodiments of the present disclosure described below are intended for implementation in LiDAR system with non-uniform magnification optics. Some of the basic elements of a LiDAR system 10 may be better appreciated by referring to the schematic block diagram depicted in FIG. 2. The LiDAR system 10 comprises an optical emitter module 12 for emission of a train of optical pulses having predetermined characteristics, and an optical receiver module 14 for the capture and pre-processing of the return signal waveforms. For example, the signal waveforms originate from the fraction of the emitted optical pulse energy that is reflected or backscattered by an object 16 located at range R from the LiDAR system 10, and which is in the field of view (FoV) of the receiver optics 18. In this non-limiting example, a control and processing unit 20 controls the operation of both optical emitter 12 and optical receiver 14 modules. Among other things, the control process may synchronize the emission of each individual optical pulse with the start of the sampling and ND data conversion of the return signal collected by the receiver module 14. A digital clock 22 may be used to generate clock signals for the control and processing unit 20 to ensure precise timing of both modules, for example.

Optical Emitter Module

Upon reception of a trigger signal from the control and processing unit 20, the driver electronics 24 may generate an electrical current pulse whose duration lies in the ns range. The current pulse is then routed to the light source 26 for emission of an optical pulse. The light source 26 is generally a laser, but other types of optical sources, such as light-emitting diodes (LEDs), can be envisioned without departing from the scope of the present disclosure. The use of semiconductor laser diode assemblies now prevails in LiDAR systems. The laser diode assembly may comprise a single-emitter laser diode, a multiple-emitter laser diode, or even a two-dimensional stacked array of multiple-emitter laser diodes. The specific type of light source integrated in a LiDAR system 10 depends, inter alia, on factors such as the peak optical output power required for successful ranging at the desired maximum range, the emission wavelength, and the device cost. Light sources such as fiber lasers, microchip lasers and even solid-state lasers find their way in LiDAR applications, particularly when no laser diode source exists at the desired emission wavelength. The optical pulses pass through the emitter optics 28 before leaving the optical emitter module 12. The emitter optics 28 shapes the optical pulses in the form of a beam having the desired propagation characteristics. The primary optical beam characteristics may be the beam divergence, the transverse size of the beam irradiance profile at the exit aperture of the emitter module 12 (e.g., for eye safety concerns), and the spatial beam quality. The emitter 28 and receiver optics 18 are generally boresighted so as the optical beam path and the field of view of the receiver module 14 overlap over a predetermined range interval.

Optical Receiver Module

The return optical signals collected by the receiver optics 18 may pass through a narrowband optical filter 30 for removal of the parasitic background light before impinging on the sensitive surface of a photodetector 32. The photodetector 32 is generally an avalanche or PIN photodiode, or a 1D or 2D array of such photodiodes, with material composition suited to the wavelength of the optical pulses. The current from the photodetector 32 may then fed to a transimpedance (current to voltage) amplifier 34. Also, the signal may or may not be pre-amplified as an APD typically has an internal current multiplication gain which may be sufficient.

The amplifier circuit may comprise a matched filter to limit the electrical bandwidth of the optical receiver module 14. The control and processing unit 20 may control the amplifier gain to ensure that the signal amplitude fits within the input voltage dynamic range of the A/D converter 36. It is known in the art that other amplifier configurations could be used as well, such as a logarithmic amplifier or a set of amplifiers mounted in parallel, each amplifier having a fixed gain. The A/D converter 36 digitizes the input voltage signals at a sampling rate of typically several tens of MS/s (mega-samples per second) to a few thousands of MS/s. The time period between two consecutive digital sampling operations defines the extent of the so-called range bins of the system 10, when expressed in units of distance.

In many cases the output of the LiDAR system may be used by autonomous computer-based processes, e.g., to make navigation or mobility decisions in autonomous vehicle applications. In some cases, a user may operate the system 10 and receive data from it through the user interface hardware 38. For instance, the measured range to the targeted object 16 and/or a more detailed 3D map of the field of view may be displayed in digital form on a liquid-crystal or plasma visual display 40. In augmented reality applications, the detailed 3D map data may be combined with high-definition image data, e.g., from a high-definition digital camera (not shown), in order to allow virtual objects/elements to be placed in a virtual environment displayed on the display 40.

Vehicles of all types now use LiDAR to determine which obstacles are nearby and how far away they are. The 3D maps provided by LiDAR components not only detect and position objects but also identify what they are. Insights uncovered by LiDAR also help a vehicle's computer system to predict how objects will behave, and adjust the vehicle's driving accordingly.

Semi- and fully-autonomous vehicles may use a combination of sensor technologies. This sensor suite could include Radar, which provides constant distance and velocity measurements as well as superior all-weather performance, but lacks in resolution, and struggles with the mapping of finer details at longer ranges. Camera vision, also commonly used in automotive and mobility applications, provides high-resolution information in 2D. However, there is a strong dependency on powerful Artificial Intelligence and corresponding software to translate captured data into 3D interpretations. Environmental and lighting conditions may significantly impact camera vision technology.

LiDAR, in contrast, offers precise 3D measurement data over short to long ranges, even in challenging weather and lighting conditions. This technology can be combined with other sensory data to provide a more reliable representation of both static and moving objects in the vehicle's environment.

Hence, LiDAR technology has become a highly accessible solution to enable obstacle detection, avoidance, and safe navigation through various environments in a variety of vehicles. Today, LiDARs are used in many critical automotive and mobility applications, including advanced driver assistance systems and autonomous driving.

In many autonomous driving implementations, the main navigation system interfaces with one or a few LiDAR sensors. It is desirable that the LiDAR sensor(s) offer high ranges and high resolutions in order to support functions such as localization, mapping and collision avoidance. In terms of localization, the first step of environment perception for autonomous vehicles is often to estimate the trajectories of the vehicle. Since Global Navigation Satellite System (GNSS) are generally inaccurate and not available in all situations, the Simultaneous Localization and Mapping (SLAM) technique is used to solve that problem. In terms of collision avoidance, a long detection range at cruising speed potentially provides sufficient time to react softly in case of an obstacle detection. For example, for standing users inside a shuttle, a safe and comfortable deceleration of 1.5 m/s$^2$ may be desirable. As an example, at 40 km/h, and at 1.5 m/s$^2$ deceleration, a distance of 47 m is needed to stop the shuttle, assuming a 0.5 s reaction time.

Many autonomous shuttles today rely on a long-range mechanical-scanning LiDAR sensor that is placed on top of the shuttle.

Figure 3:
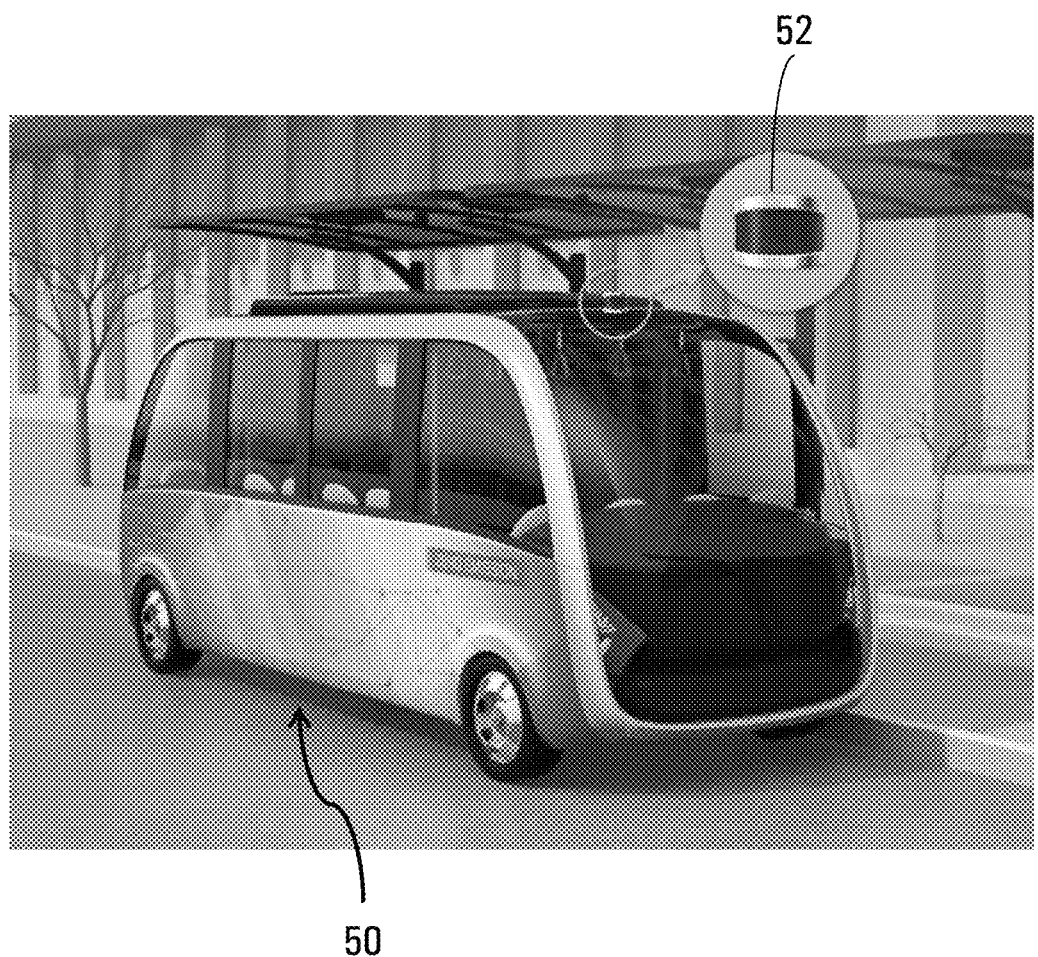
FIG. 3 shows an example of an autonomous driving vehicle configured as a multi-person shuttle with a conventional mechanical-scanning LiDAR sensor mounted on the top of the shuttle near the front of the shuttle.

FIG. 3 shows an example of an autonomous driving vehicle 50 configured as a multi-person shuttle with a conventional mechanical-scanning LiDAR sensor 52 mounted on the top of the shuttle near the front of the shuttle. However, as discussed earlier, mechanical-scanning devices, such as a gimbal or spinning disks or polygons often come with resolution issues, maintenance issues, assembly issues and/or temperature dependence issues.

Therefore, it would be desirable to provide LiDAR systems with solid state scanning devices that avoid or at least mitigate one or more of these issues.

In terms of range and resolution, it is generally desirable to provide detectability at greater range and sufficient resolution to be able to accurately categorize detected objects.

Figure 4:
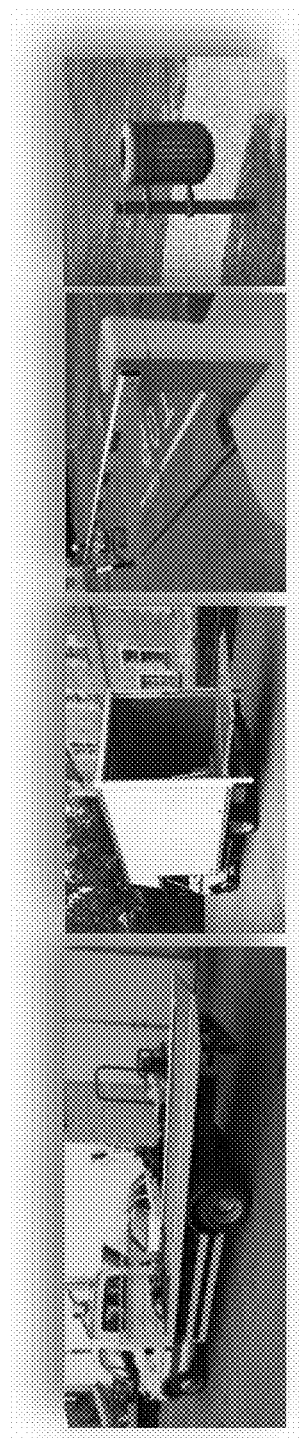
FIG. 4 shows examples of external objects having features above ground level that can pose detection problems for conventional LiDAR systems.

FIG. 4 shows examples of external objects having features above ground level that can pose detection problems for conventional LiDAR systems in autonomous driving or mobility applications. In particular, the examples include a flatbed vehicle, a tail loading lift, a parking gate and a hanging trashcan. Such objects are potentially problematic because they are not laying on the ground and have a relatively narrow vertical profile at some point above the ground that must be avoided in order to avoid a collision.

Figure 5:
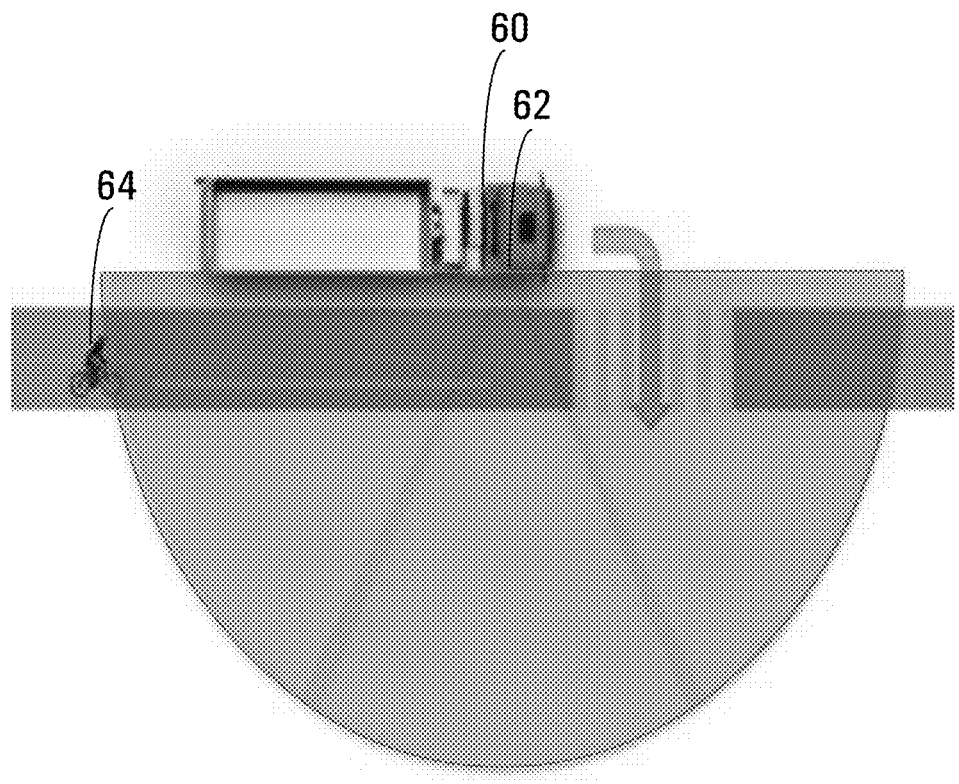
FIG. 5 shows an example of a potential use for a wide-angle LiDAR system for turning assistance.

As another aspect of collision avoidance, a LiDAR system with a side-looking field of view (FoV) can potentially be useful for turning assistance, particularly on larger vehicles, such as trucks or buses. For example, FIG. 5 shows an example of a potential use for a wide-angle side-looking LiDAR system for turning assistance on a freight truck. In this example, the LiDAR system 62 has a FoV that extends over substantially 180° and a range that extends in front of and behind the right side of the truck 60, which can help avoid a collision with a cyclist 64 or moving objects or people within the FoV during a right hand turn. For example, if a moving object is detected within the FoV in advance of, or while executing a right hand turn, the driver of the truck may be alerted to the detection and/or the navigation system, if present, may autonomously take mitigating steps, e.g., by activating the brakes or steering away.

Figure 6:
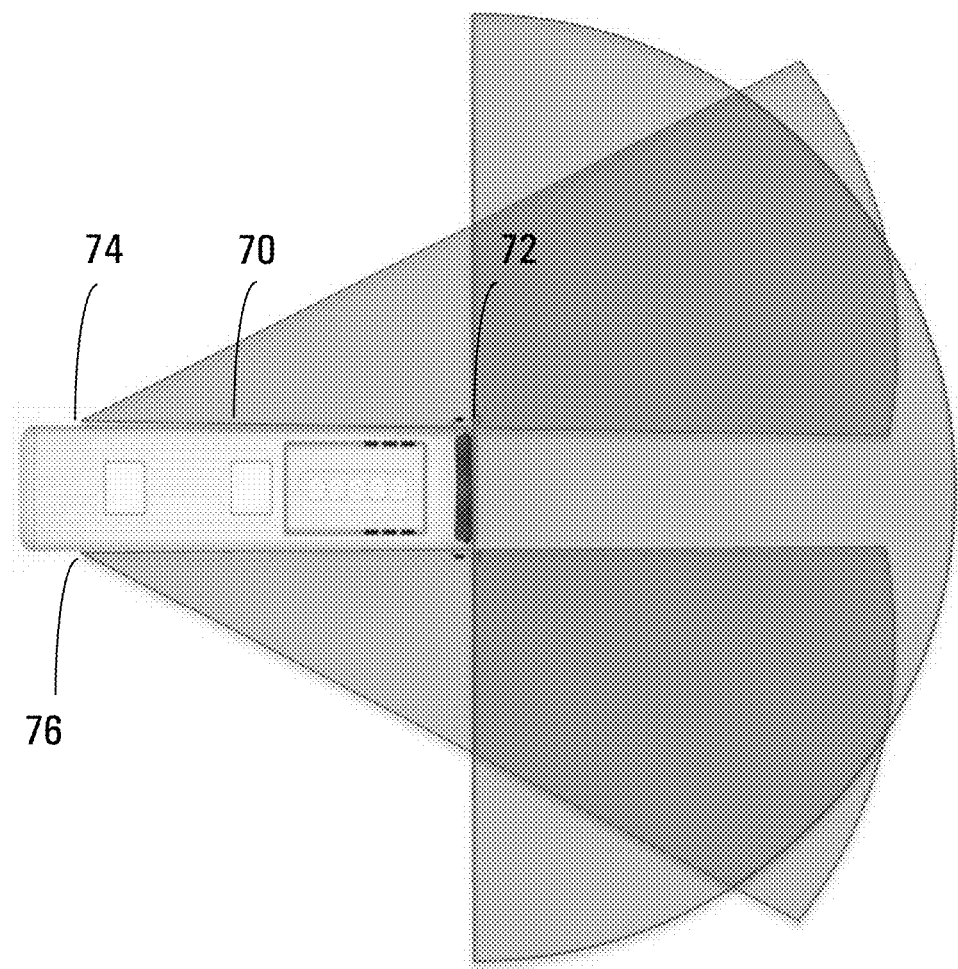
FIG. 6 shows another example of a potential use for a wide-angle LiDAR system for blind spot coverage.

FIG. 6 shows another example of a potential use for a wide-angle LiDAR system for blind spot coverage on a bus 70. In particular, in this example, the bus 70 has a wide-angle LiDAR system that includes a first LiDAR sensor 72 providing a wide-angle FoV in front of the bus 70 and two side mounted LiDAR sensors 74 and 76 mounted on the left and right sides of the bus, respectively, which have FoVs that cover the common blindspots at the front and sides of a bus.

Figure 7A:
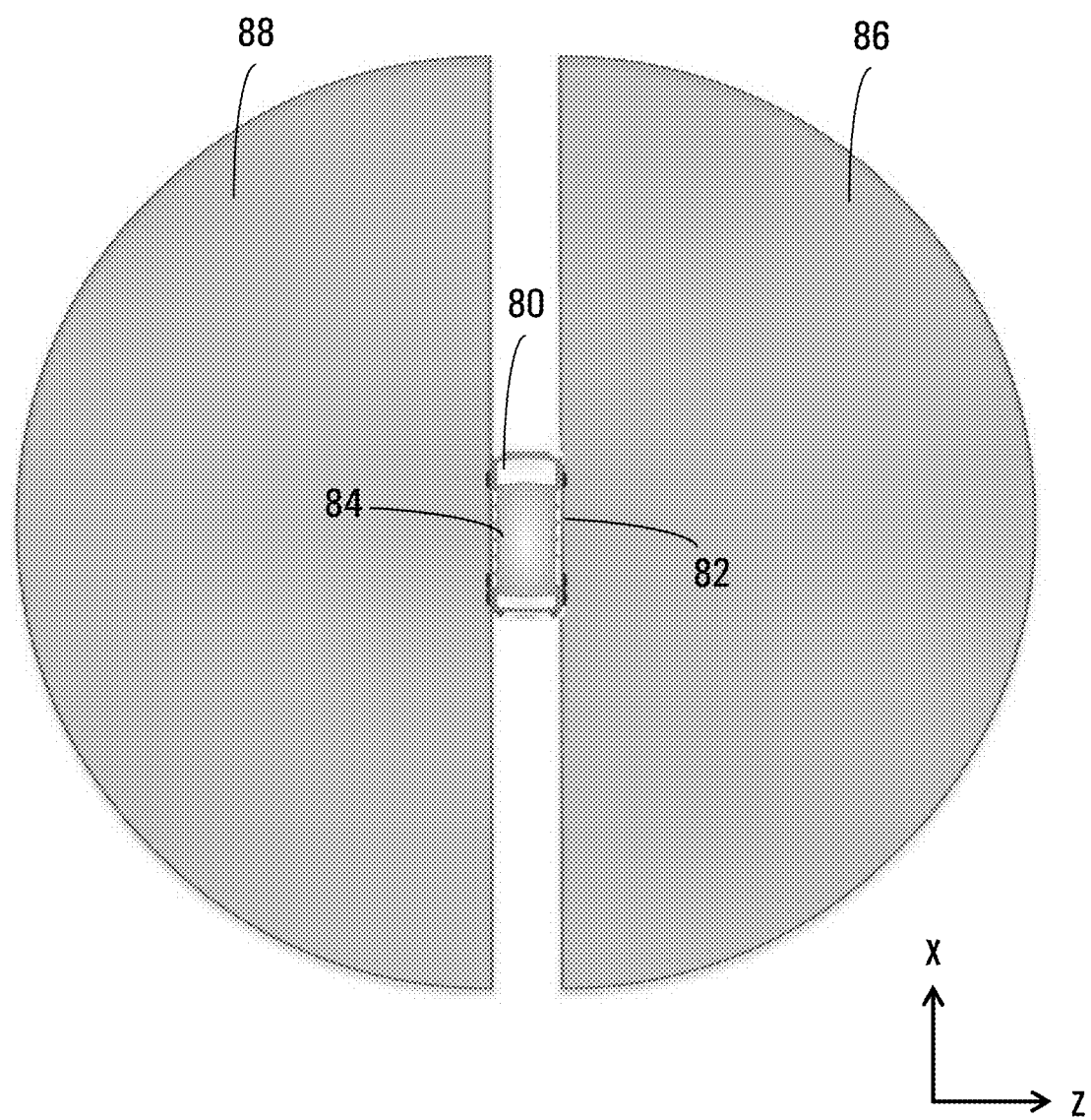
FIGS. 7A, 7B and 7C show top, side and front views, respectively, of a shuttle vehicle having a high side-mounted wide-angle LiDAR system with a Field of View that extends in a vertical direction substantially 90° from the horizon to the ground and in a horizontal direction substantially 180° from the rear of the shuttle to the front of the shuttle.
Figure 7B:
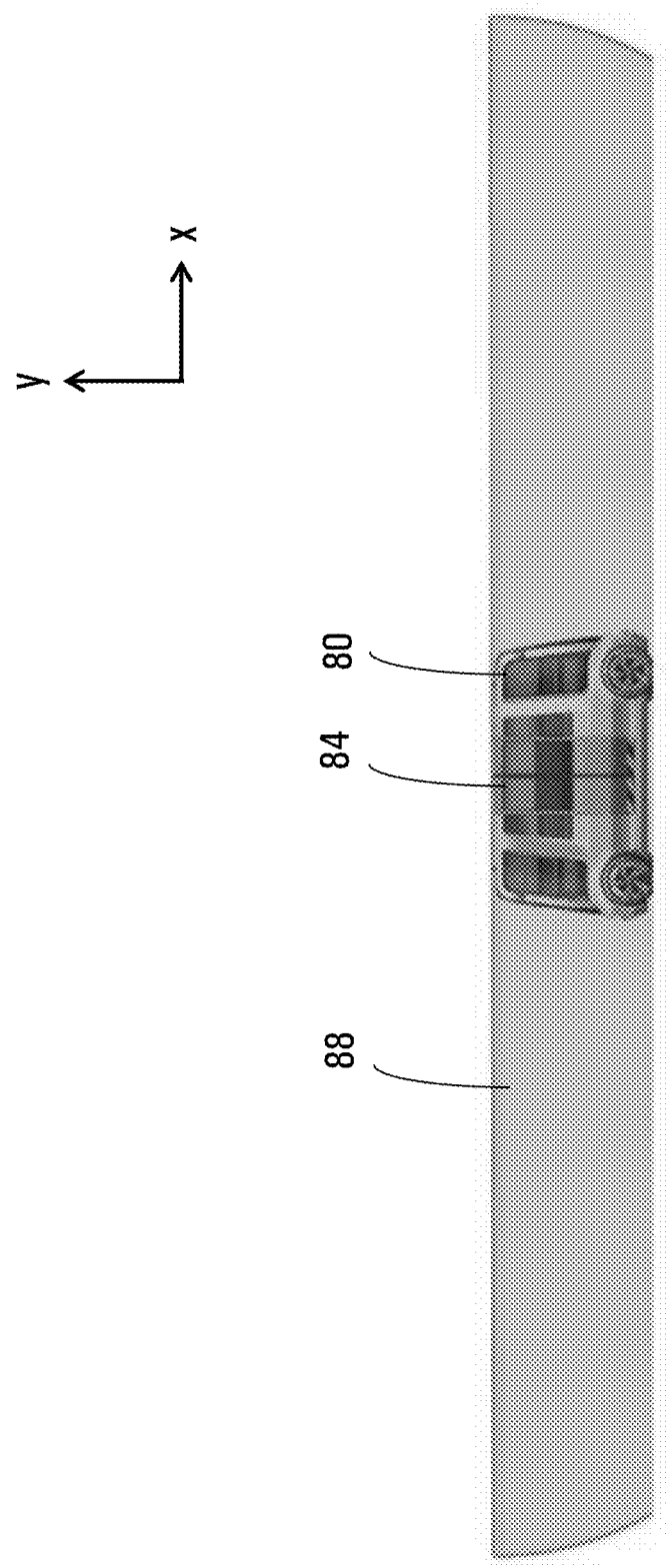
Figure 7C:
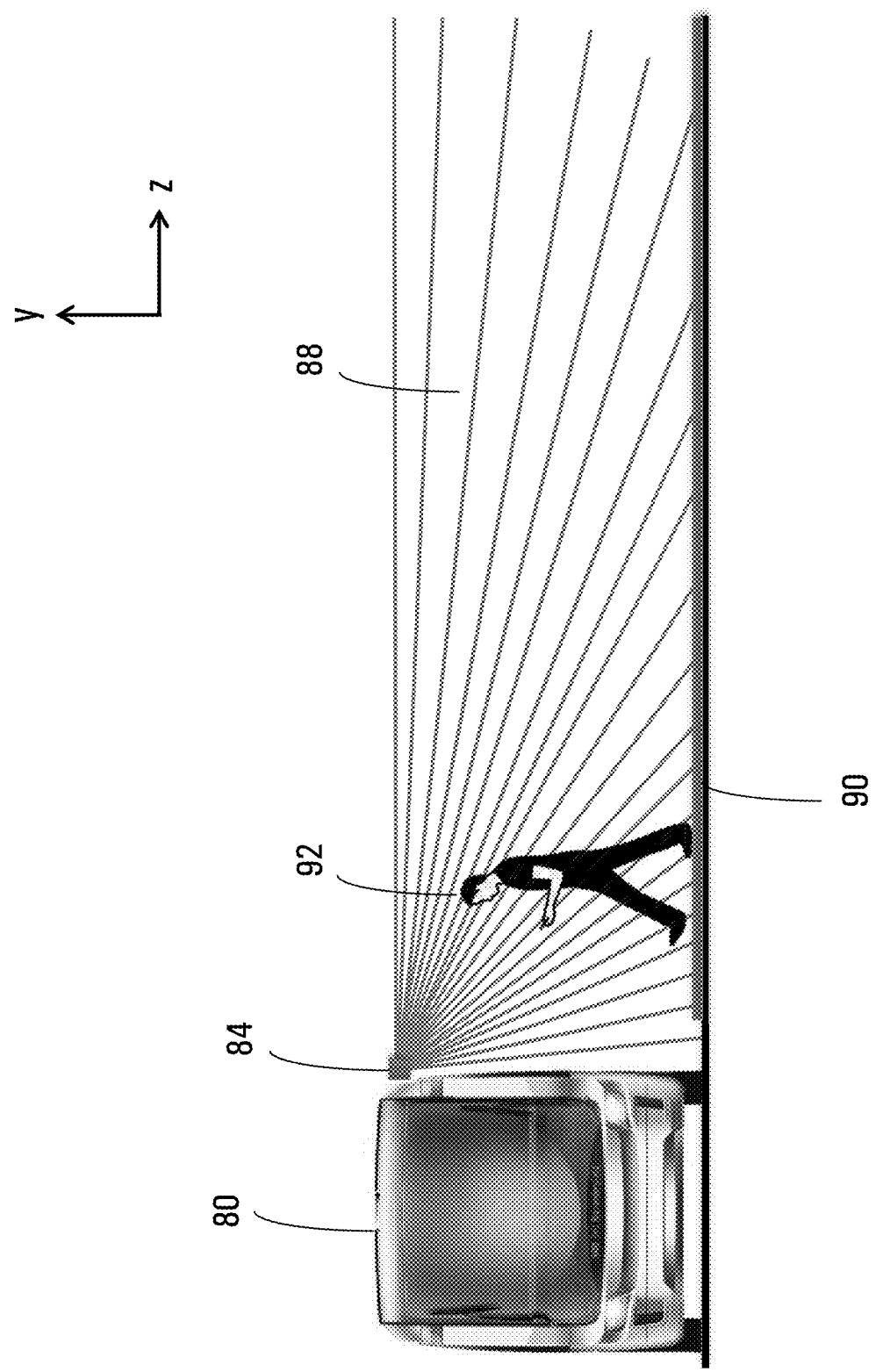

FIGS. 7A, 7B and 7C show top, side and front views, respectively, of a shuttle vehicle 80 having a wide-angle LiDAR system that include a high side-mounted wide-angle LiDAR sensor 82,84 on each side of shuttle 80. Each LiDAR sensor 82, 84 has a FoV 86,88 that extends in a vertical direction substantially 90° from the horizon to the ground and in a horizontal direction substantially 180° from the rear of the shuttle to the front of the shuttle. It is noted that in FIG. 7C only the left side mounted LiDAR sensor 84 is shown in order to avoid clutter in the drawing. In the following description, the following nomenclature has been adopted: the horizontal and vertical directions will be designated with the Cartesian coordinates x and y, respectively, and the direction perpendicular to the x-y plane is designated with the Cartesian coordinate z.

Referring to FIG. 7C, since the position on the vehicle is at the top, the vertical FoV of the LiDAR sensor 84 points primarily towards the ground 90.

Figure 8:
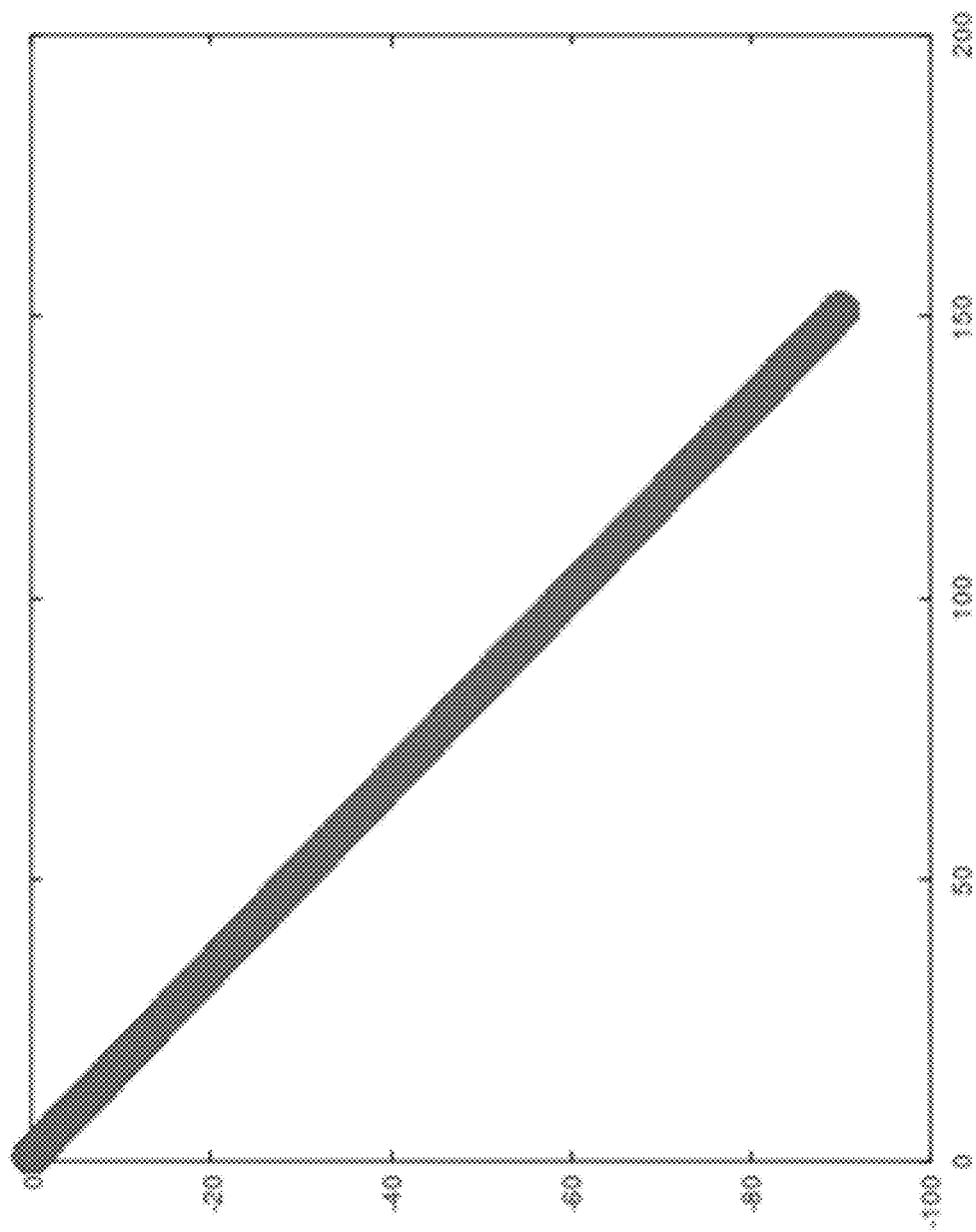
FIG. 8 shows an example of a uniform vertical angular distribution extending over substantially 90° from the horizon to the ground.

FIG. 8 shows an example of a uniform vertical angular distribution of 150 points extending over substantially 90° from the horizon to the ground 90 thereby providing a uniform vertical resolution of 0.6°. If the LiDAR system were designed with a uniform horizontal resolutions of 0.2° and a uniform vertical resolution of 0.6°, the FoV, which covers substantially 180° horizontal and 90° vertical would require a total of 135,000 pixels, most of which would be pointing at the ground near the vehicle.

Figure 9A:
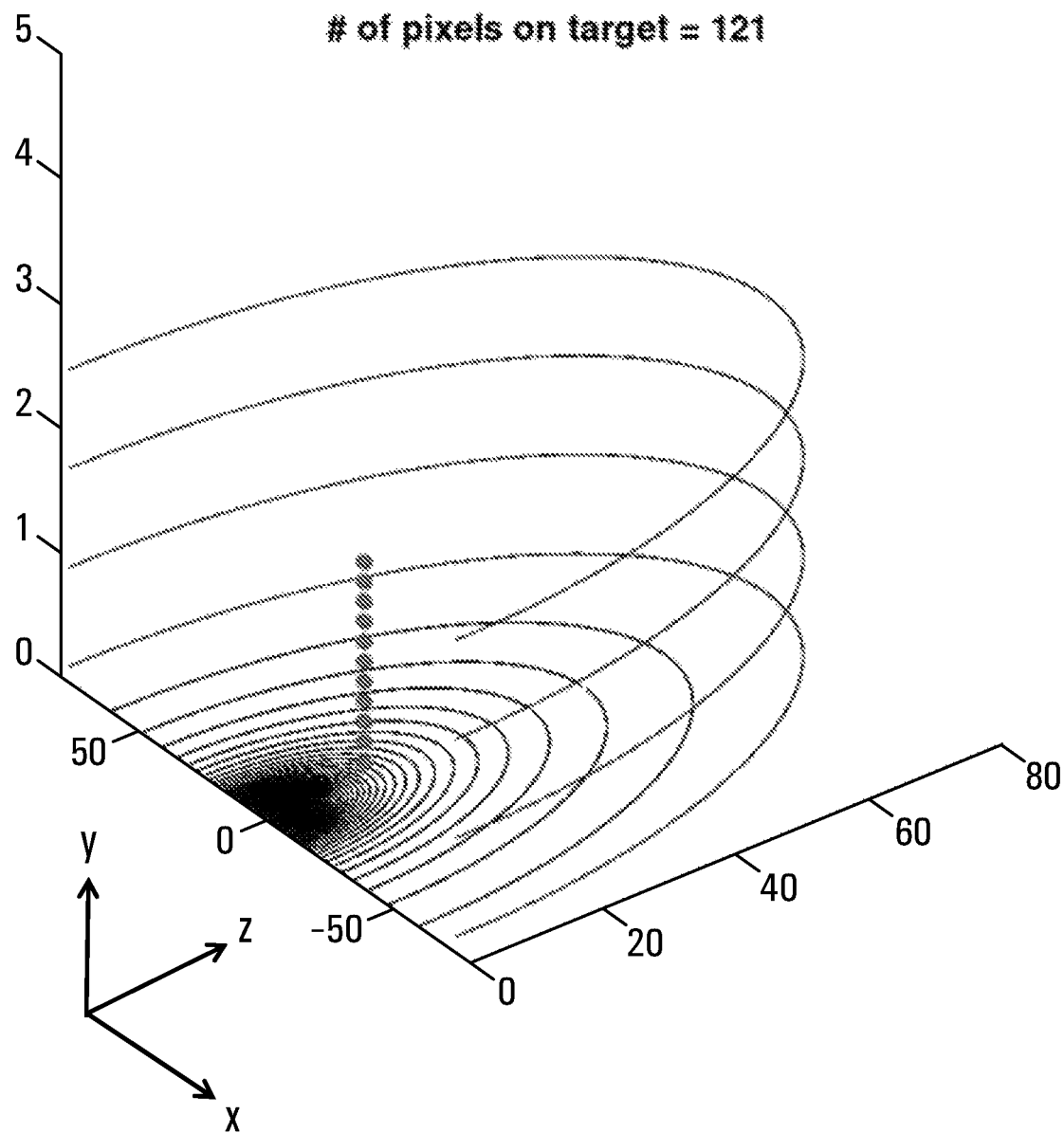
FIGS. 9A and 9B show example plots of simulated LiDAR pixel data for a LiDAR system having the uniform vertical angular distribution of FIG. 8 with a 0.5 m×1.8 m target at distances of 15 m and 5 m, respectively.
Figure 9B:
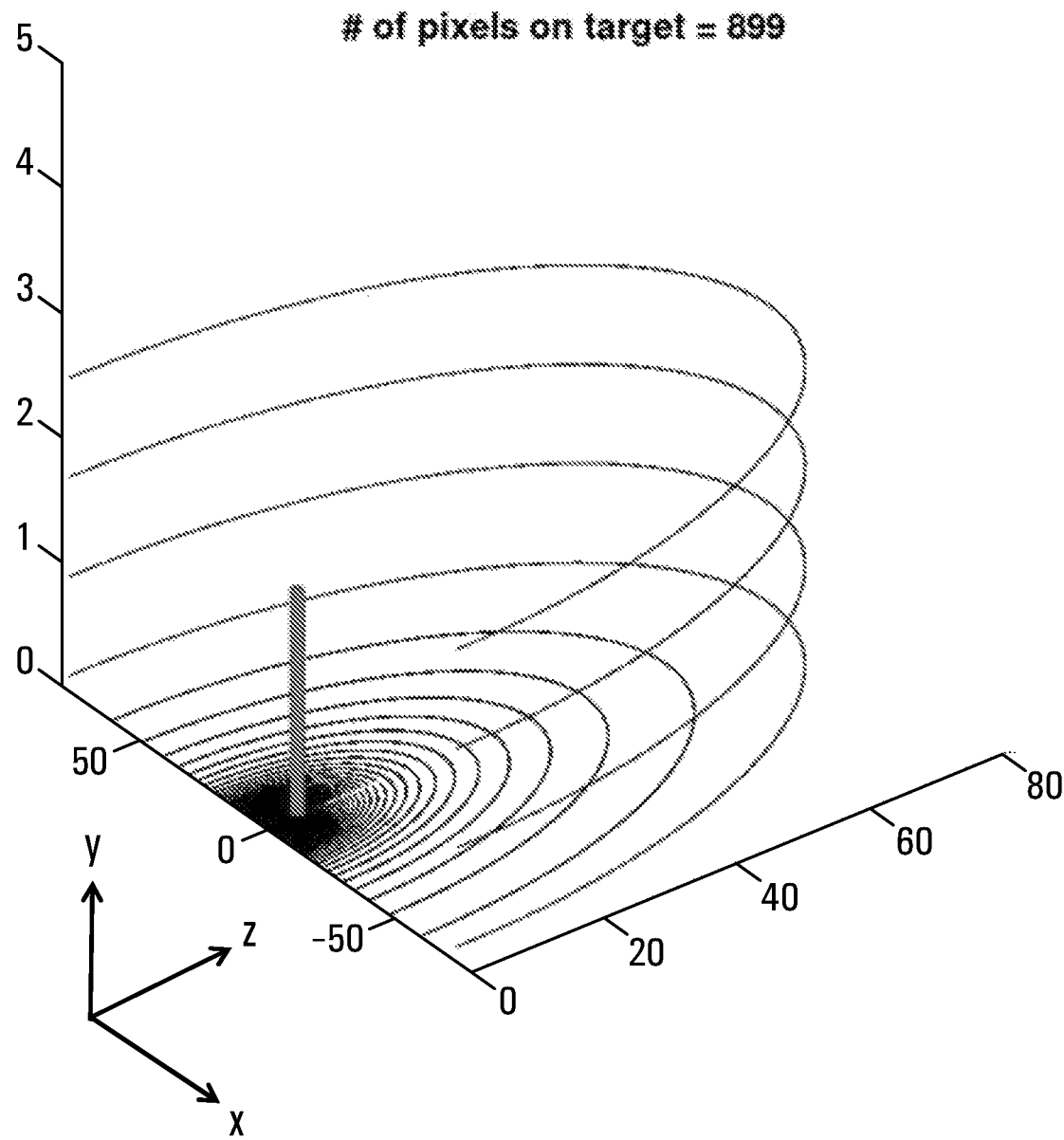

For example, FIGS. 9A and 9B show example plots of simulated LiDAR pixel data for the LiDAR sensor 84 having the uniform vertical angular distribution of FIG. 8 with a 0.5 m×1.8 m target at distances of 15 m and 5 m, respectively. A pedestrian, such as the pedestrian 92 shown in FIG. 7C may be represented by a 0.5 m×1.8 m target. As shown in FIGS. 9A and 9B, at distances of 15 m and 5 m respectively, the LiDAR sensor 84 would have 121 and 899 pixels, respectively, on the pedestrian 92. This level of coverage is typically not necessary for object detection/classification, which can typically be done reliably with as few as 3-15 pixels.

In order to cover the same vertical FoV, i.e., substantially 90° from the horizon to the ground 90, while having relatively higher vertical resolution in certain parts of the vertical FoV and relatively lower vertical resolutions in other parts of the vertical FoV, the inventors of the present disclosure have conceived of utilizing a non-uniform vertical angular distribution of scanning beams, thereby providing non-uniform vertical resolution.

Figure 10:
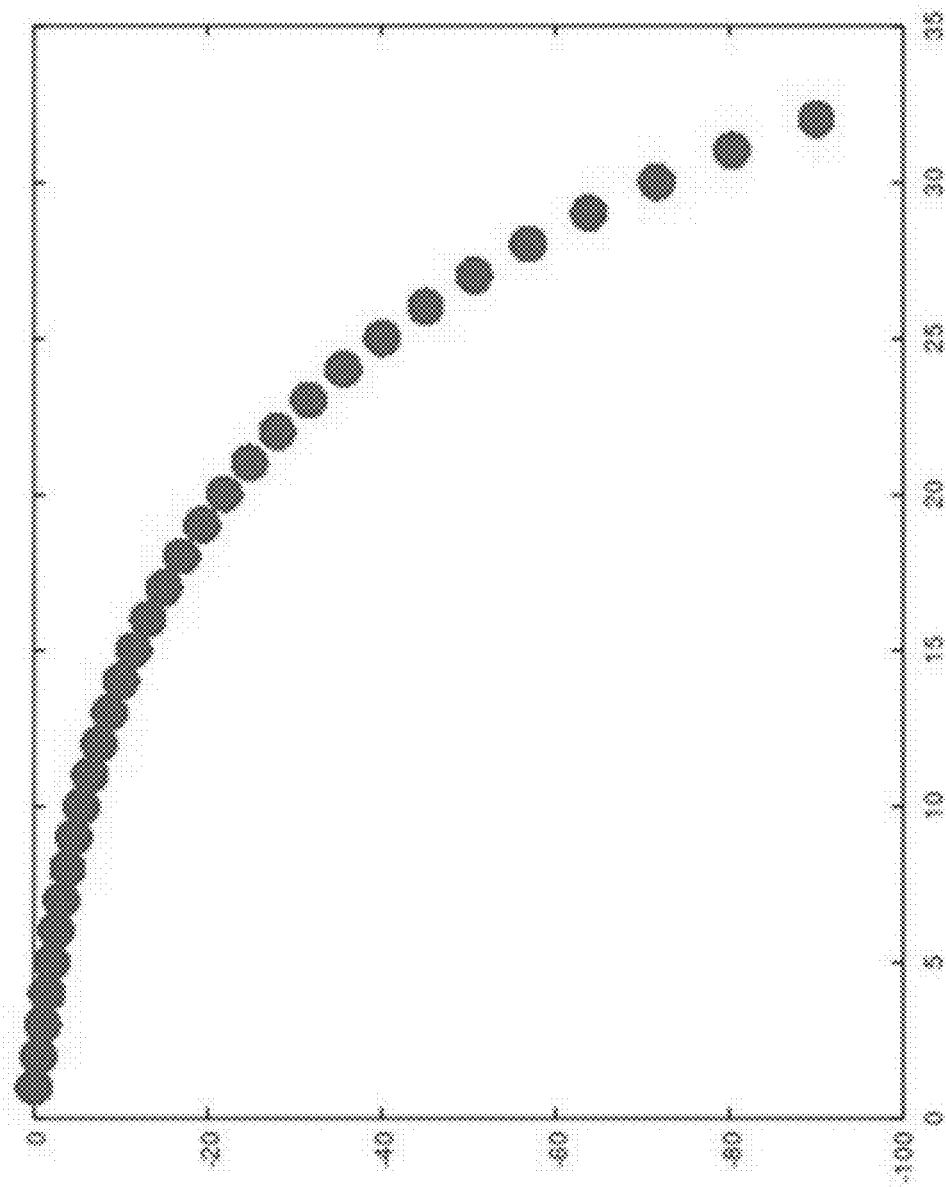
FIG. 10 shows an example of a non-uniform vertical angular distribution extending over substantially 90° from the horizon to the ground.

For example, FIG. 10 shows an example of a non-uniform vertical angular distribution of 32 points extending over substantially 90° from the horizon to the ground 90 defined by the following source code:

```
LL = 1:31;
    RES_NL = 2.90802E-01 * exp(1.10636E-01*LL);
V_NL(1) = 0;
    for iV = 1:length(LL)
        V_NL(iV+1) = V_NL(iV) + max([0.5 RES_NL(iV)*1.08129]);
    endfor
```

It should be noted that is merely one example of a non-linear function that may be used to generate a non-uniform angular distribution. Moreover, a person of ordinary skill in the art will recognize that the choice of the distribution and the number of points over a given angular range may vary depending on performance requirements, such as the minimum required vertical resolution, the minimum number of points on a target of a given size at a given distance, etc.

Figure 11:
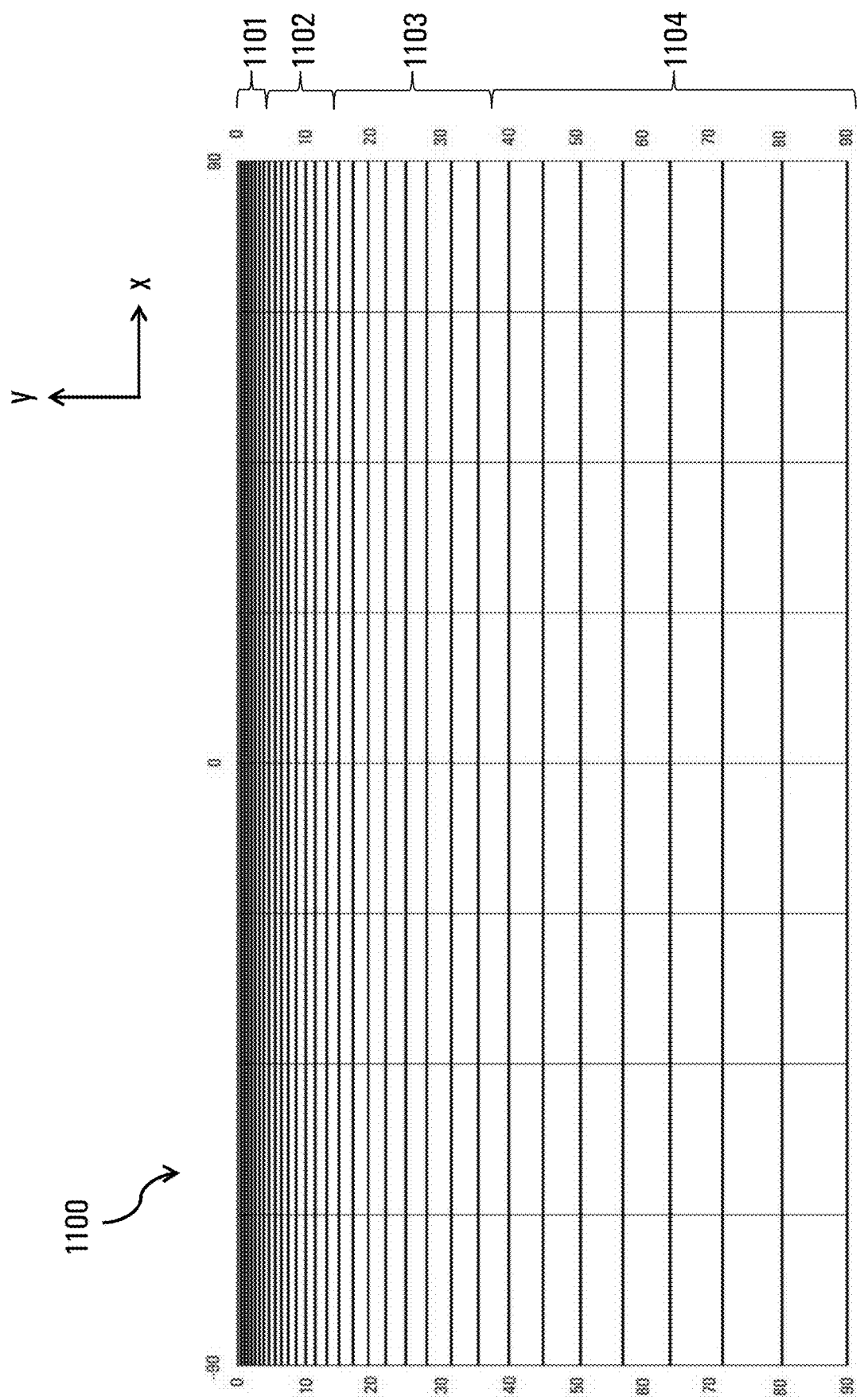
FIG. 11 shows an example of a segmented FoV having areas of non-uniform vertical resolution based on the non-uniform vertical angular distribution of FIG. 10 over substantially 90° from the horizon to the ground and uniform horizontal resolution over substantially 180° in the horizontal direction.

FIG. 11 shows an example of a segmented FoV having areas of non-uniform vertical resolution based on the non-uniform vertical angular distribution of FIG. 10 over substantially 90° from the horizon to the ground in the vertical directly y and uniform horizontal resolution over substantially 180° in the horizontal direction x.

Figure 12A:
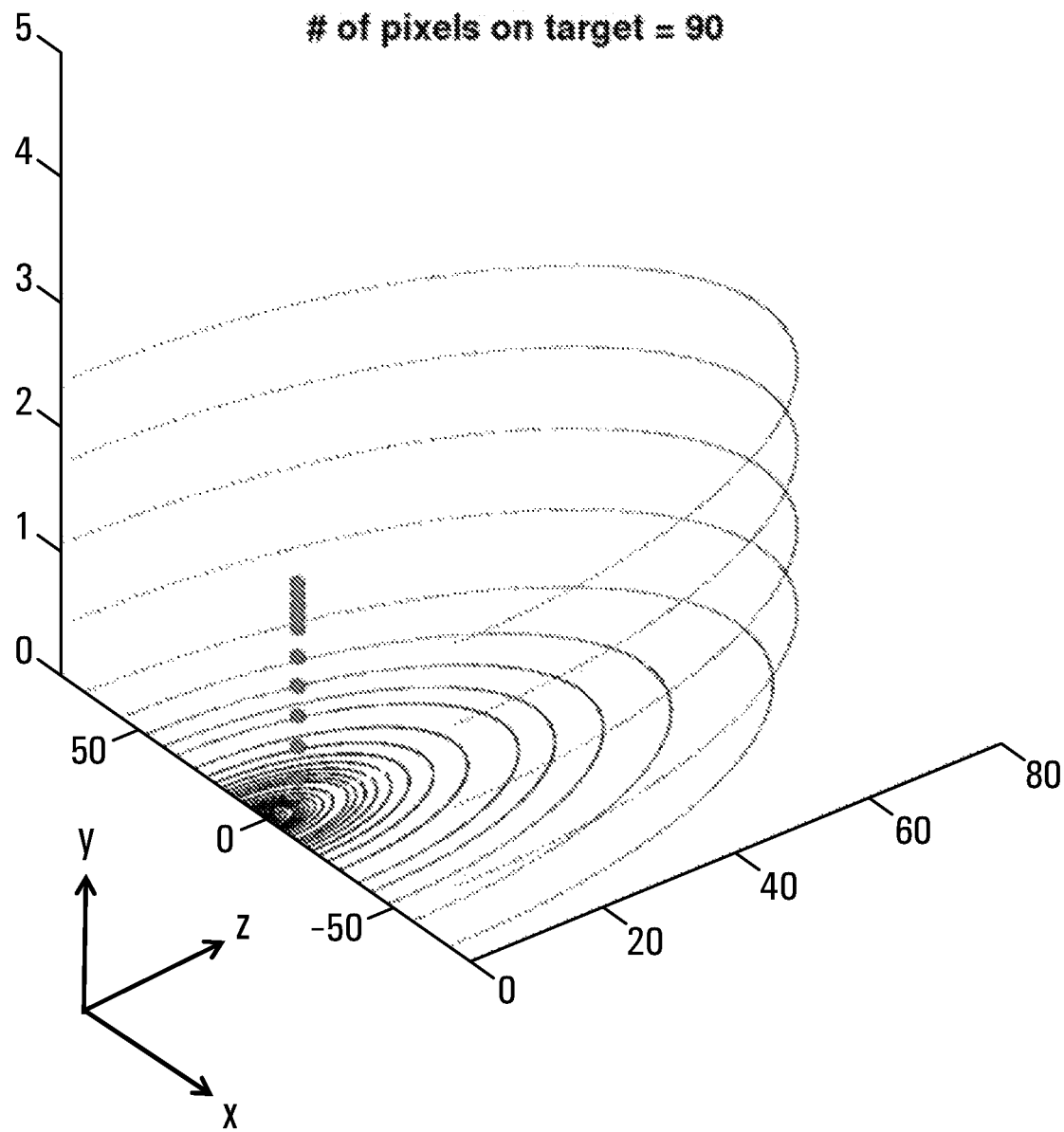
FIGS. 12A, 12B and 12C show example plots of simulated LiDAR pixel data fora LiDAR system having the non-uniform vertical angular distribution of FIGS. 10 and 11 with a 0.5 m×1.8 m target at distances of 5 m, 15 m and 50 m, respectively.
Figure 12B:
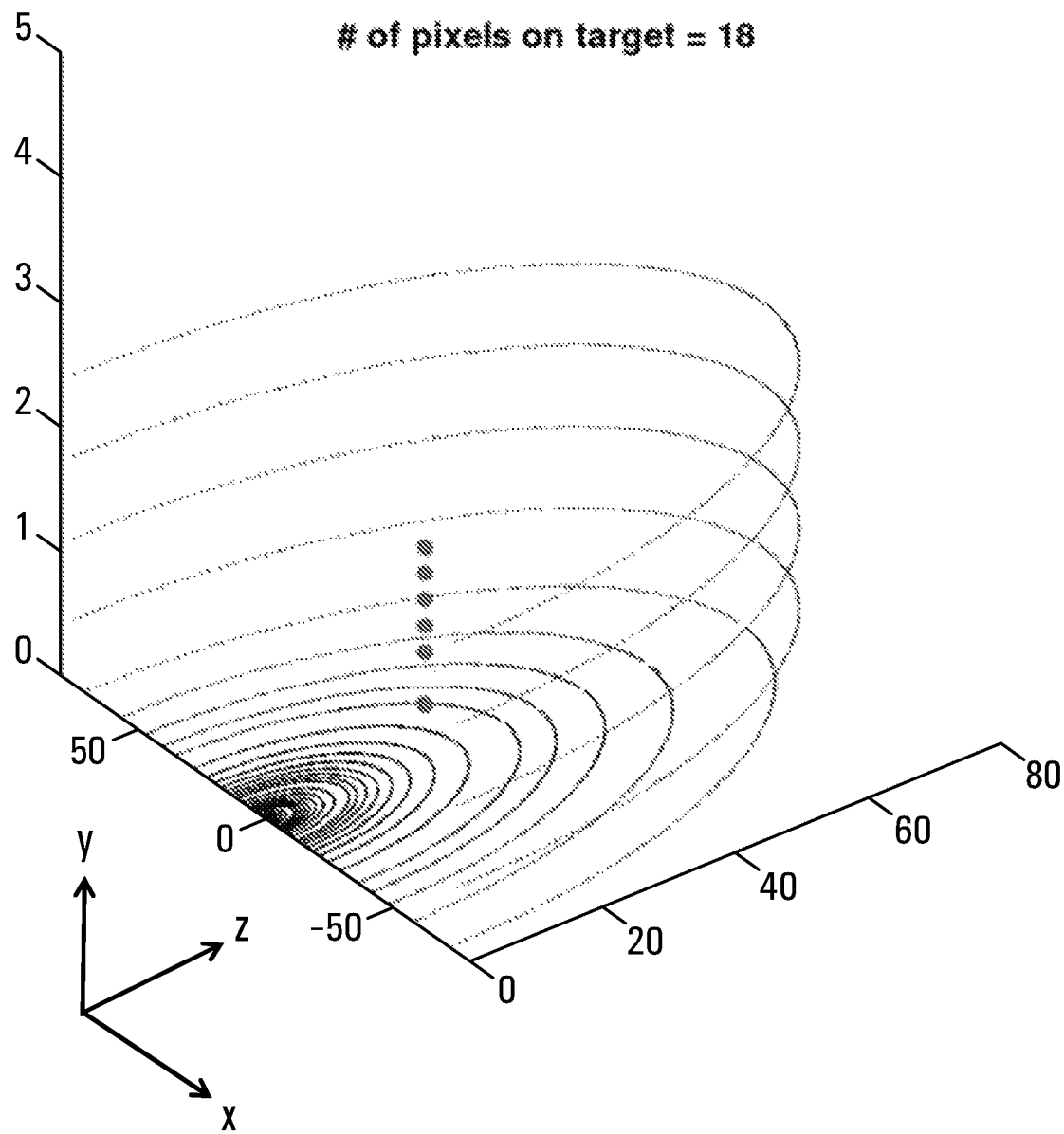
Figure 12C:
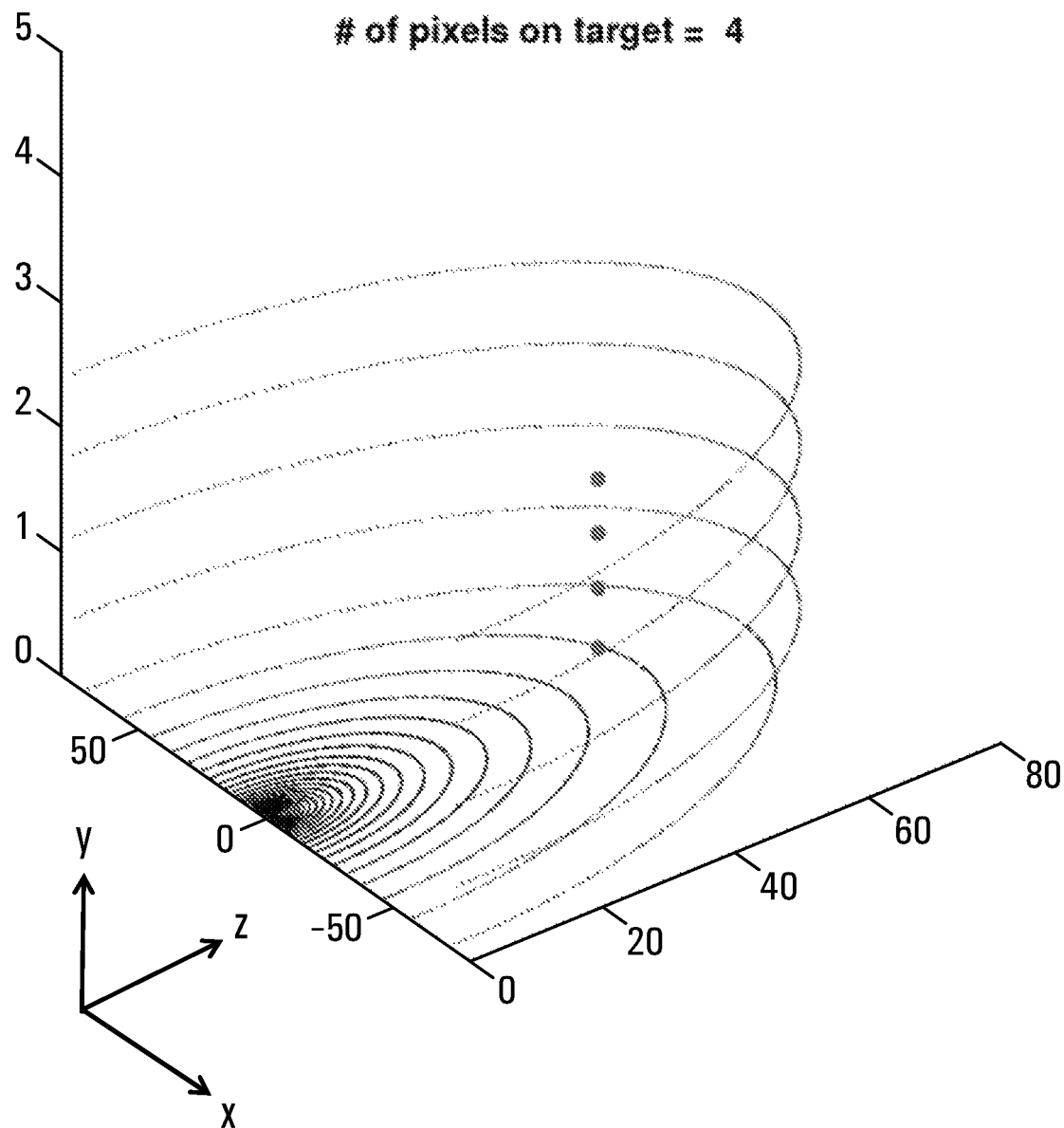

FIGS. 12A, 12B and 12C show example plots of simulated LiDAR pixel data fora LiDAR system having the non-uniform vertical angular distribution of FIGS. 10 and 11 with a 0.5 m×1.8 m target at distances of 5 m, 15 m and 50 m, respectively. As shown in FIGS. 12A, 12B and 12C, at distances of 5 m, 15 m and 50 m, respectively, the LiDAR sensor 84 having the non-uniform vertical angular distribution of FIGS. 10 and 11 would have 90, 18 and 4 pixels, respectively, on a 0.5 m×1.8 m target (e.g., the pedestrian 92 of FIG. 7C). This level of coverage is generally sufficient for object detection/classification, which, as noted earlier, can typically be done reliably with as few as 3-15 pixels on a target.

A segmented FoV with uniform horizontal resolution and non-uniform vertical resolution can potentially be realized in many ways. For example, non-uniform magnification optics may be used either alone or in combination with a beam steering device in order to achieve a FoV with such properties.

Figure 13:
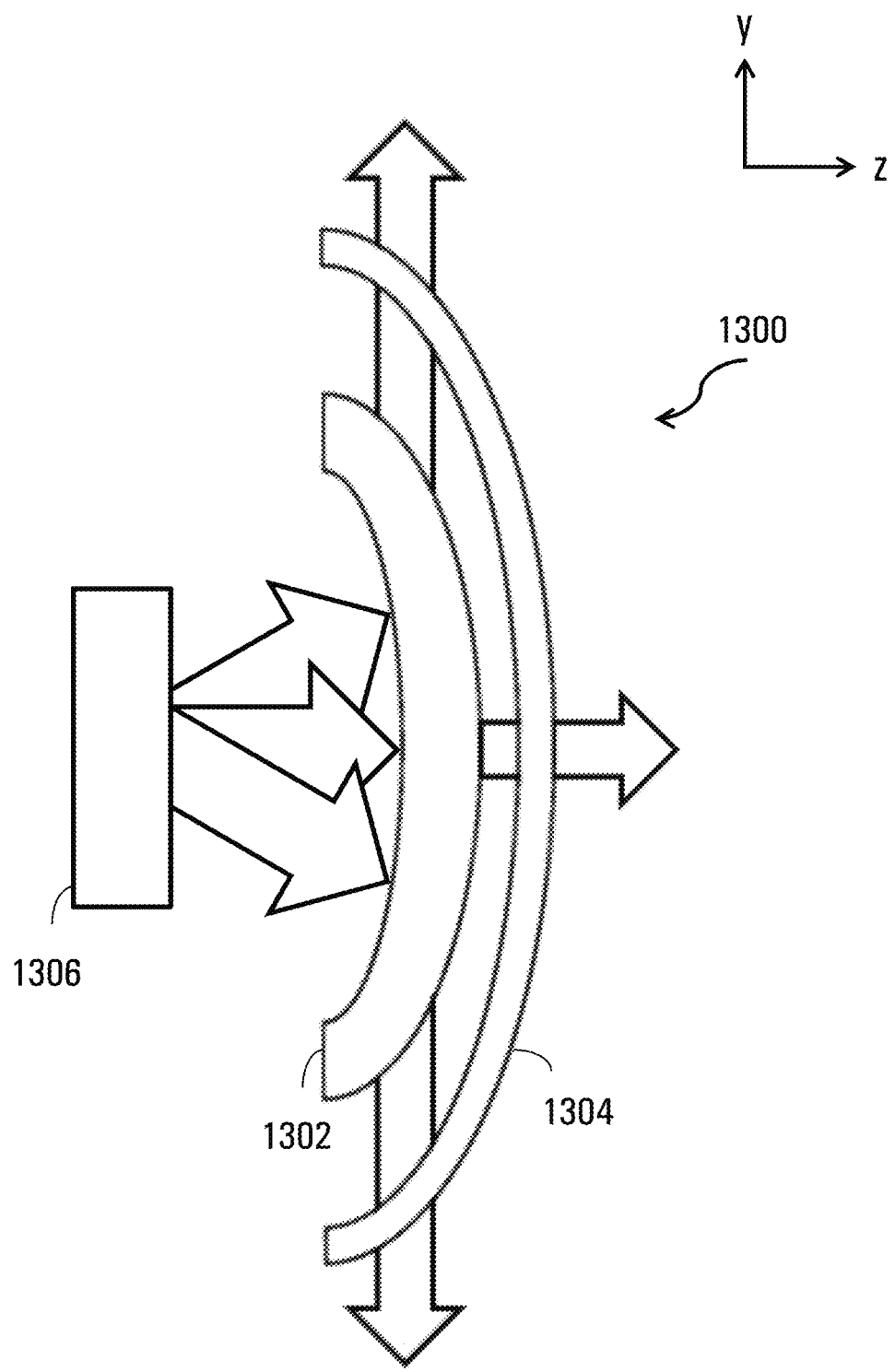
FIG. 13 shows an example of magnification optics used to amplify the angular distribution of an optical emitter module in accordance with an embodiment of the present disclosure.

FIG. 13 shows an example of a LiDAR system 1300 having non-uniform magnification optics 1302 that amplifies the angular distribution of an optical emitter module 1306 in accordance with an embodiment of the present disclosure. A number of components of the LiDAR system 1300 have been omitted from the illustration in the interest of clarity. In this specific example, the magnification optics 1302 magnifies the maximum angular range of approximately ±30° achievable by the emitter module 1306 to approximately ±180°, thereby increasing the effective FoV of the LiDAR system 1300. In FIG. 13, the LiDAR system 1300 includes a cover 1304 that protects the magnification optics 1302. In some implementations such a cover may be unnecessary and therefore may be omitted. In some embodiments, the magnification optics 1302 may have an image point distribution function that is non-linear relative to a vertical field angle of object points in the FoV. For example, in some embodiments the magnification optics 1302 may provide a non-uniform vertical resolution over the vertical field of view similar to the segmented FoV 1100 shown in FIG. 11.

In some embodiments, non-uniform magnification optics, such as the non-uniform magnification optics 1302 shown in FIG. 13 may be used to provide a non-uniform distribution of uniformly distributed steering angles from a beam steering component (not shown) that may be part of the emitter module 1306 or as a separate component located between the emitter module 1306 and the magnification optics 1302.

For example, returning to the segmented FoV 1100 shown in FIG. 11, the 32 non-uniformly distributed vertical angles can potentially be grouped into four groups of eight angles each, wherein each successive group has a lower average vertical resolution, as indicated at 1101, 1102, 1103 and 1104 in FIG. 11. This type of distribution of 32 vertical angles can be realized using an 8 channel laser light source, a beam steering device capable of steering each of the 8 laser channels in 4 vertical directions, and non-uniform magnification optics to non-uniformly distribute the 8 laser channels in each of the 4 vertical directions. For example, such a beam steering device could potentially be implemented with a non-mechanical beam steering device such as a liquid crystal polarization grating (LCPG). By "non-mechanical" is meant a beam steering device that performs beam steering without mechanical displacement or movement of the component performing the beam steering operation.

LCPGs, with nearly ideal diffraction efficiencies (>99.5%) have been experimentally demonstrated over a wide range of grating periods, wavelengths (visible to near-IR), and areas. Each polarization grating stage can double the maximum steered angle in one dimension without major efficiency reductions, so very large steered angles are possible (at least to ±40° field of regard). The structure at the heart of these devices is a polarization grating (PG), implemented using nematic liquid crystals. The nematic director is a continuous, in-plane, bend-splay pattern established using a UV polarization hologram exposing photo-alignment materials. When voltage is applied, the director orients out of plane, effectively erasing the grating. A single LCPG stage can be considered the key component with three possible directions (±θ and 0°), but additional steering angles are possible by stacking LCPG stages.

In another example of implementation, the beam steering device includes one or more LCPG stages, where each stage includes an LC switch and a passive grating. This configuration allows two possible steering directions.

It should be noted that an LCPG is merely one example of a non-mechanical beam steering device that may be used in some embodiments of the present disclosure. Other non-limiting examples of beam steering devices, such an optical phased arrays (OPAs) or microelectromechanical systems (MEMS) that may be utilized in some embodiments of the present disclosure are described, for example, in Paul F. McManamon, Abtin Ataei, "Progress and opportunities in optical beam steering," Proc. SPIE 10926, Quantum Sensing and Nano Electronics and Photonics XVI, 1092610 (29 May 2019), which is incorporated herein by reference in its entirety.

Figure 14:
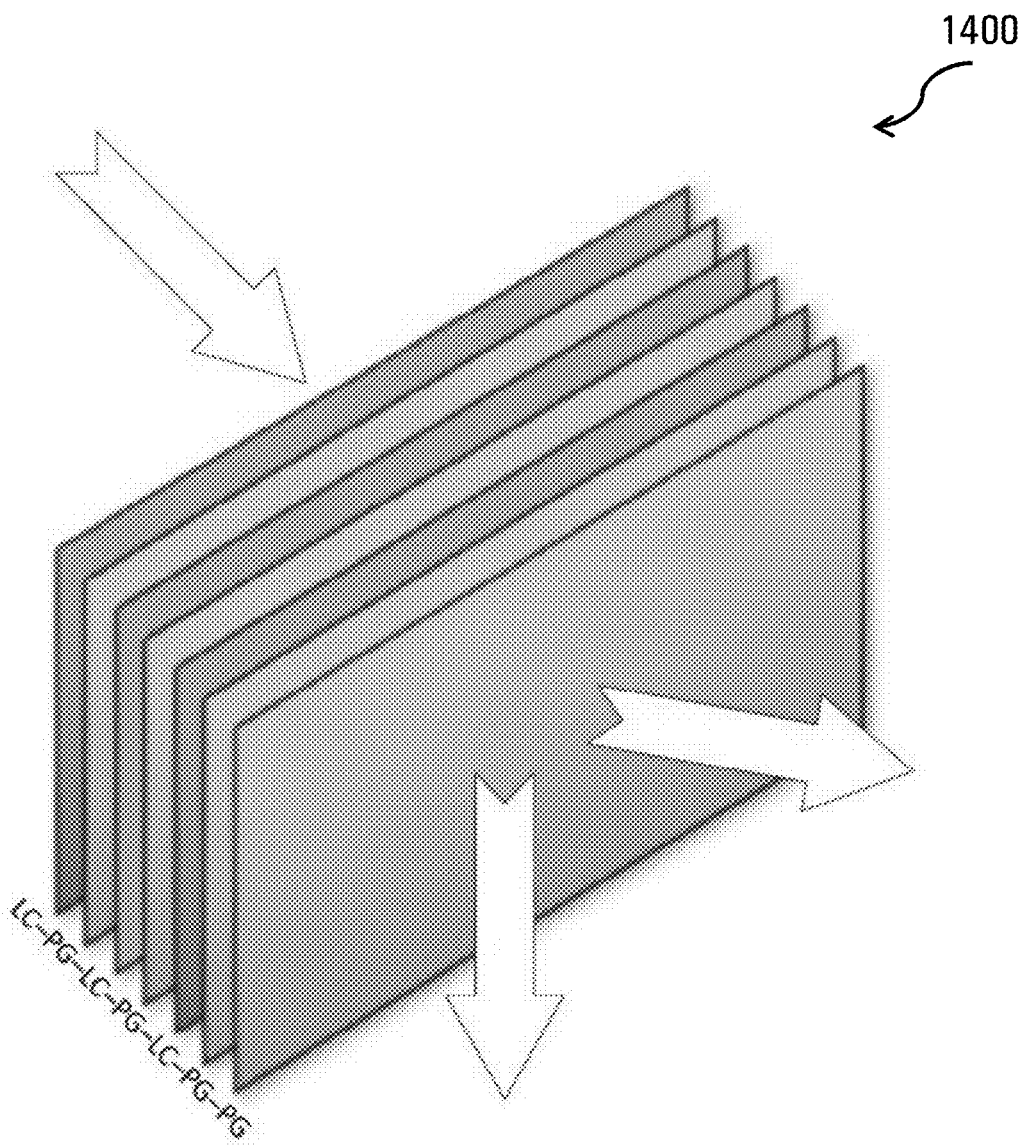
FIG. 14 shows an example of a digital beam steering component implemented using a liquid crystal polarization grating (LCPG) in accordance with an embodiment of the present disclosure.

FIG. 14 shows an example of a digital beam steering component implemented using a LCPG 1400 in accordance with an embodiment of the present disclosure. In this example, the LCPG 1400 includes seven stacked optical plates forming three steering stages and is configured for use with a laser that has a linear polarization. The optical plates are either a Liquid Crystal (LC) or a polarization grating (PG). The assembly is configured to achieve both vertical steering angles and horizontal steering angles. The LCPG has a nominal FoV of 7.5°×6.0° (Horizontal×Vertical) for a given steering direction or "tile" and a full FoV of 120°×24°.

Figure 15:
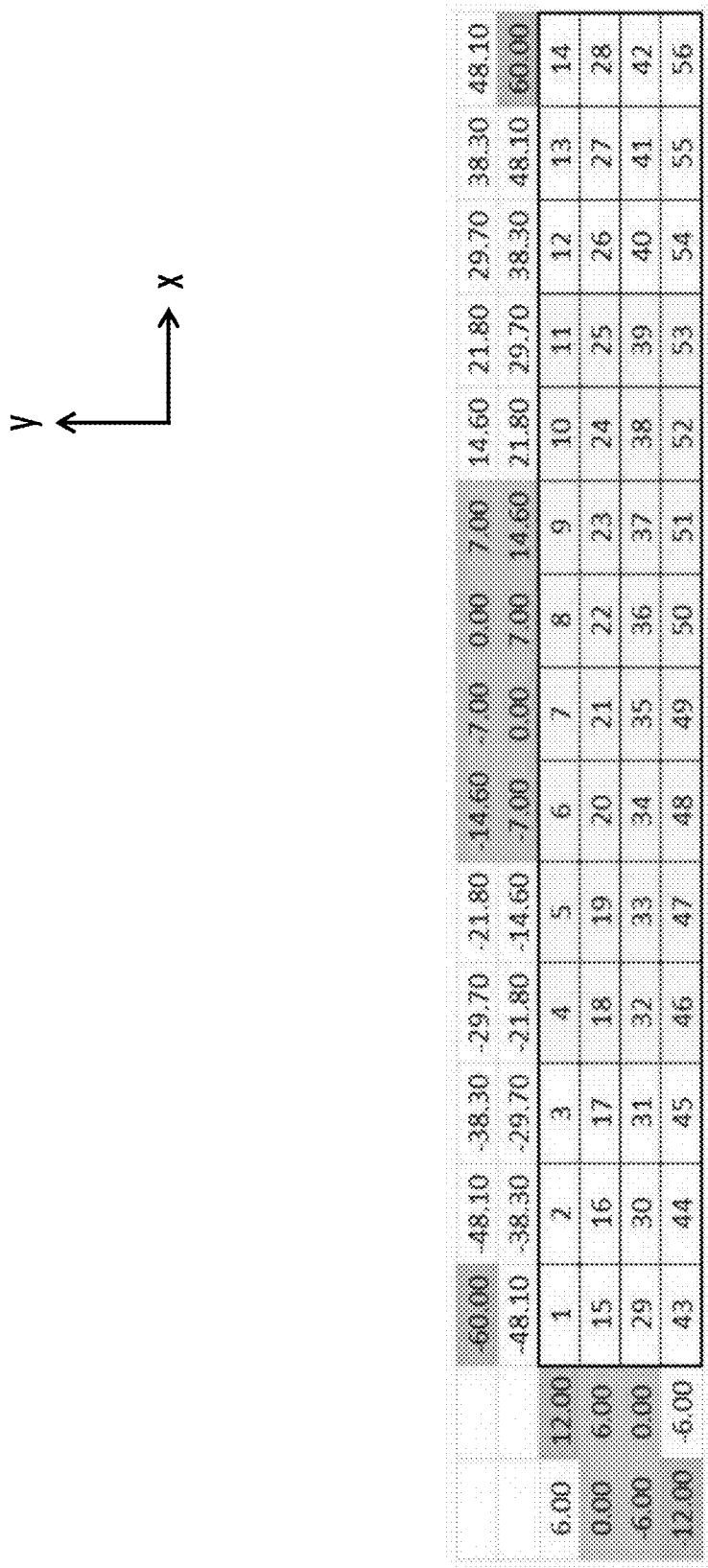
FIG. 15 shows an example of two dimensional (2D) beam steering angles that are possible using the LCPG beam steering element of FIG. 14.

FIG. 15 shows an example of two-dimensional (2D) beam steering angles that are possible using the LCPG beam steering element 1400 of FIG. 14. It is noted that the LCPG beam steering element 1400 is capable of steering in 14 different horizontal directions and 4 vertical directions. Each pair of a horizontal direction and a vertical direction in which the LCPG is capable of steering may be referred to as a "tile" in the full FoV of the LCPG. In this case, the LCPG 1400 is capable of steering in any one of 14×4 tiles, each with a nominal optical field of view of 7.5°×6.0°, thereby providing a full FoV of 120°×24°. In the table shown in FIG. 15, minimum and maximum angles of each tile's Horizontal FoV is shown above the addresses of the tiles, and the minimum and maximum angles of each tile's Vertical FoV is shown at the left of the tiles addresses. For example, tile 6 has minimum and maximum angles of Horizontal FoV equal to −14.6° and −7°, respectively, and minimum and maximum angles of Vertical FoV equal to 6° and 12°, respectively.

Figure 16:
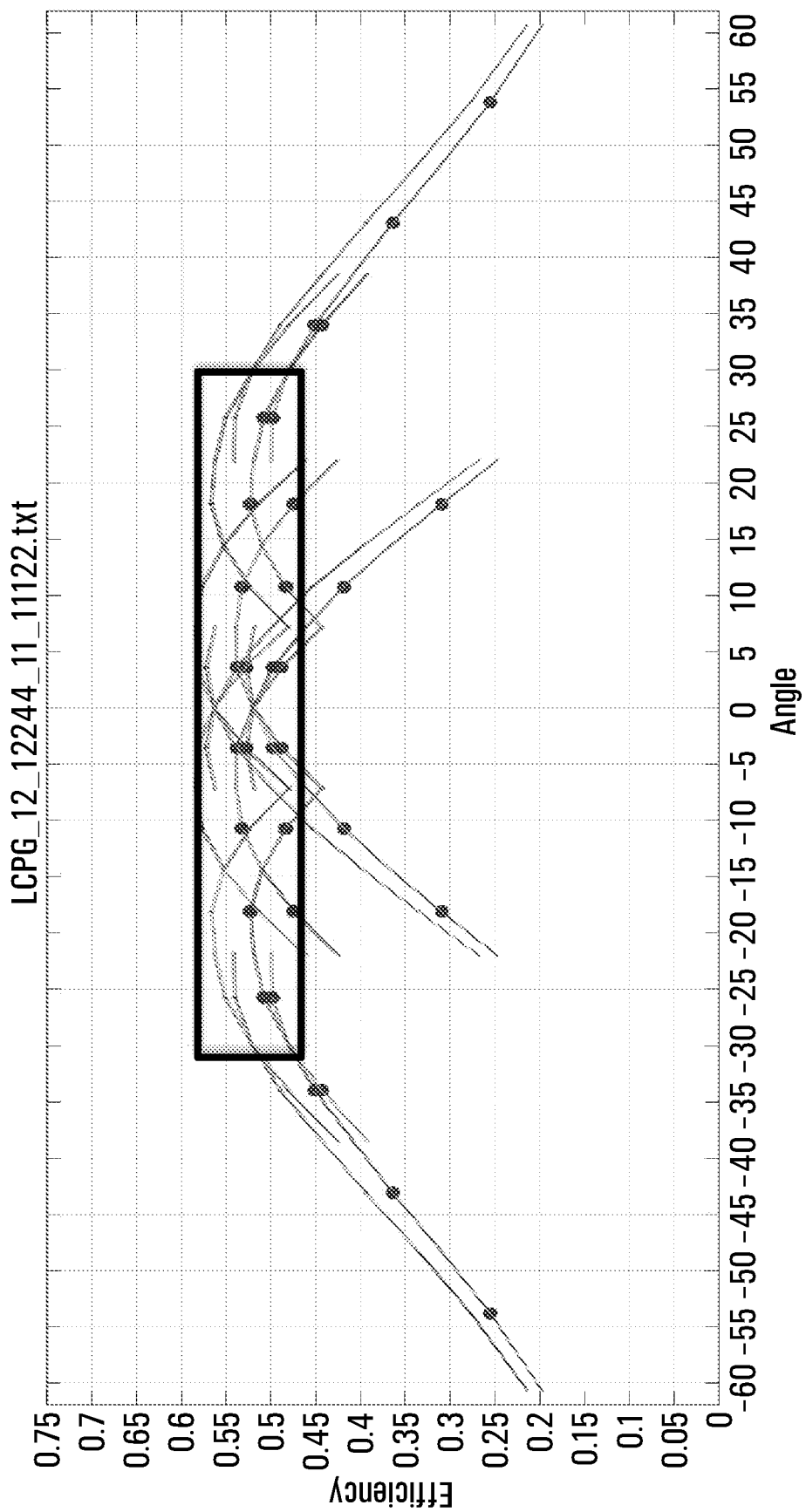
FIG. 16 shows an example plot of transmission and reception efficiencies vs. steering angle for the LCPG beam steering element of FIG. 14.

However, the emission and reception efficiencies of the LCPG 1400 are not constant with steering angle. FIG. 16 shows an example plot of emission and reception efficiencies vs. horizontal steering angle for the LCPG beam steering element 1400 of FIG. 14. Emitter efficiency is the top curve (small dots) and receiver efficiency is the bottom curve (large dots). The difference between the emission and reception efficiencies is due to polarizer transmission, which may be 90% efficient.

Since emission and reception efficiencies drop off at higher horizontal steering angles, in the following example only the center 8×4 tiles of the LCPG 1400 are utilized for horizontal and vertical steering. In other implementations, more or fewer horizontal tiles may be used for horizontal steering to provide a wider or narrower horizontal steering range. It is also noted that, since not all tiles of the LCPG 1400 are utilized in the current embodiment, in other embodiments an LCPG with fewer horizontal steering stacks may be utilized, which could potentially reduce cost and provide a gain in efficiency, and therefore in range.

FIG. 17 shows tables of examples of non-uniform steering angle configurations and corresponding geometric distances at heights of 2.5 m and 3.5 m for the LiDAR system 84 of FIG. 7C configured to provide the segmented non-uniform FoV 1100 of FIG. 11. In this case, magnification optics having non-uniform magnification in the vertical direction will be utilized to non-uniformly distribute the substantially uniform vertical steering angles provided by the four vertical steering directions (tiles) of the LCPG 1400. Tables 2 and 3 in FIG. 17 give the distance to the ground 90 or the range if the pixel does not reach the ground 90. It is noted that, of the 32 vertical angles, 31 pixels are pointed at the ground 90, in other words these angles will intersect the ground plane at some distance from the source. Only the zero degree angle relative to the horizon will not intersect the ground plane. The four columns of each table correspond to each of the four vertical steering directions of the LCPG tiles. The eight rows of each table correspond to the eight channels of the eight-channel laser light source that is used in this example.

Nominal magnification for the four LCPG tiles is approximately 0.66×, 1.33×, 3.33× and 10×, respectively, calculated based on the increase in vertical magnification relative to the nominal uniform vertical angular resolution of 0.75° for 32 angles uniformly distributed over the 24° FoV of the LCPG.

Figure 18:
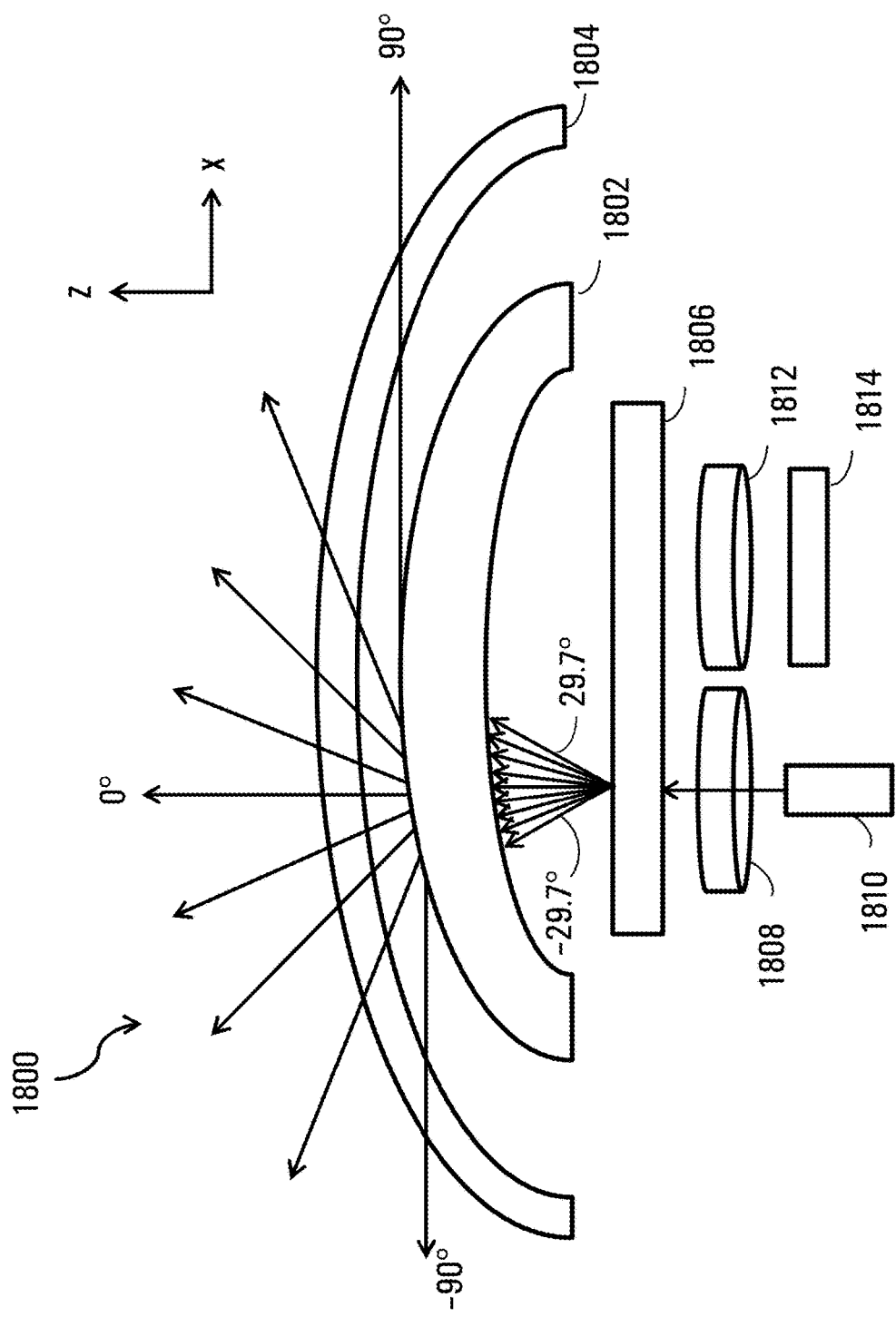
FIG. 18 shows a top down view of an example of a LiDAR system with non-uniform magnification optics that may be used to implement the segmented FoV with non-uniform vertical resolution and uniform horizontal resolution of FIG. 11.

FIG. 18 shows a top down view of an example of a LiDAR system 1800 with non-uniform magnification optics 1802 that may be used to implement the segmented FoV 1100 with non-uniform vertical resolution and uniform horizontal resolution of FIG. 11. A number of components of the LiDAR system 1800 have been omitted from the illustration in the interest of clarity. As shown in FIG. 18, the LCPG beam steering device 1806 is capable of steering optical beams from the 8-channel laser light source 1810 in any of eight horizontal directions that are generally uniformly distributed between −29.7° and 29.7°. The magnification optics 1802 is configured to provide substantially uniform magnification in the horizontal direction, and distributes the optical beams over eight segments that are generally uniformly distributed between −90° and 90°. It is noted that these eight segments correspond to the eight "columns" in the segmented FoV 1100 of FIG. 11. Although the corresponding reception path for light reflected off object(s) in the FoV back to the LiDAR system 1800 is not shown in FIG. 18 in order to avoid cluttering the drawing, the magnification optics 1802 and LCPG beam steering device 1806 essentially act in reverse for optical beams of reflected light that is received from the FoV of the LiDAR system 1800. In particular, the magnification optics 1802 takes in reflected light from the outer magnified FoV and de-magnifies it via refraction onto a reduced horizontal angular range. The received reflected light beams of a reduced horizontal angular range are then directed onto the LCPG beam steering device 1806, which, via the reception optics 1812, directs them onto sensor unit 1814

The LiDAR system 1800 has the wide-angle magnification optics 1802, a protective cover 1804 that may not be present in some embodiments, a beam steering device 1806, which in this embodiment is implemented by the 8×4 tiles of the LCPG 1400 of FIG. 14, emission optics 1808, an 8-channel laser light source 1810, reception optics 1812 and a sensor unit 1814.

Figure 19:
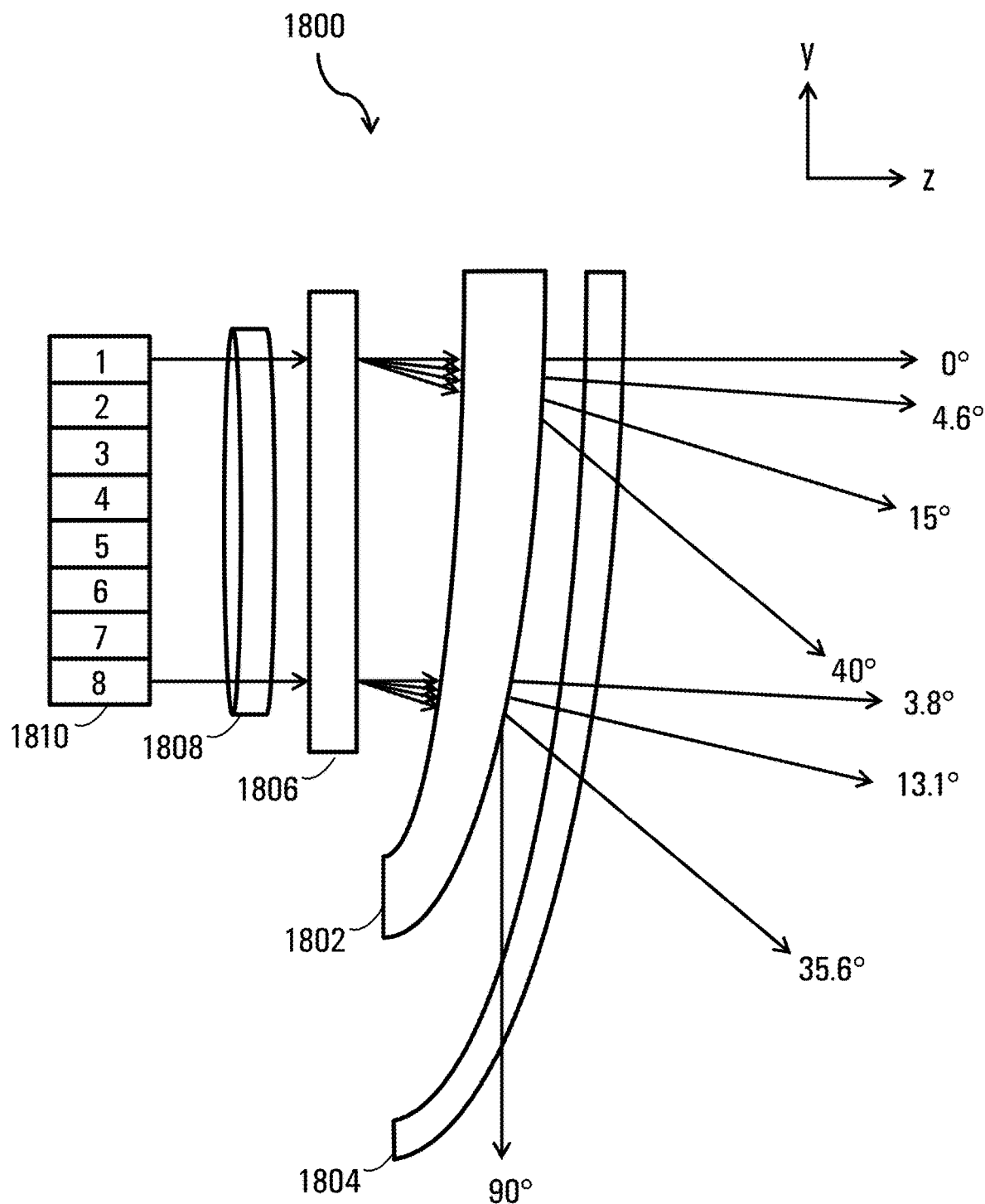
FIG. 19 shows a side on view of the LiDAR system of FIG. 18 showing the non-uniform vertical steering angles resulting from the non-uniform magnification optics.

FIG. 19 shows a side on view of the LiDAR system 1800 of FIG. 18 showing the non-uniform vertical steering angles resulting from the non-uniform magnification optics 1802. In this case, because the vertical emission angles extend substantially 90° from the horizon to the ground 90, the magnification optics 1802 could potentially be implemented with only the bottom-half of a hemispherical objective lens. In FIG. 19, the non-uniform vertical distribution of the vertical steering angles imparted by the LCPG beam steering element 1806 in the vertical direction is shown for two of the eight channels of the eight-channel laser light source 1810. In particular, FIG. 19 shows the non-uniform vertical distribution of the four vertical steering angles imparted by the four tiles of LCPG beam steering element 1806 for laser channels 1 and 8, which cover the full range of vertical steering angles over substantially 90° between the horizon and the ground 90 in the embodiment shown in FIG. 7C. More specifically, as shown in FIG. 19, the generally uniformly distributed vertical steering angles imparted to laser light from laser channel 1 by the LCPG beam steering device 1806, which nominally cover four vertical angles over a range of approximately 24°, are non-uniformly distributed at angles of 0°, 4.6°, 15° and 40° relative to the horizontal. In this way, the 24° generally uniformly distribution of the distributed vertical steering angles imparted by the LCPG beam steering device 1806 to the laser light from laser channel 1 is non-uniformly magnified to 40° by the non-uniform magnification optics 1802. Similarly, the generally uniformly distributed vertical steering angles imparted to laser light from laser channel 8 by the LCPG beam steering device 1806, which nominally cover four vertical angles over a range of approximately 24°, are non-uniformly distributed at angles of 3.8°, 13.1°, 35.6° and 90° relative to the horizontal. In this way, the 24° generally uniformly distribution of the distributed vertical steering angles imparted by the LCPG beam steering device 1806 to the laser light from laser channel 8 is non-uniformly magnified to 86.2° by the non-uniform magnification optics 1802. Here it is noted that the non-uniform distribution of vertical steering angles for laser channels 1 and 8 correspond to the configuration angles in the first and last rows, respectively, of Table 1 in FIG. 17.

In the LiDAR system 1800 shown in FIGS. 18 and 19, two of the laser channels may be activated or "fired" at the same time, such that optical impulses from alternating pairs of laser channels are transmitted according to a particular firing sequence. In such embodiments, the sensor unit 1814 may be implemented by an array of avalanche photodiodes (APDs) arranged in a 32×2 array configuration, whereby each of the two sets of 32 APDs measures one horizontal segment of the segmented FoV 1100 for one of the two lasers fired at a given time.

Figure 20:
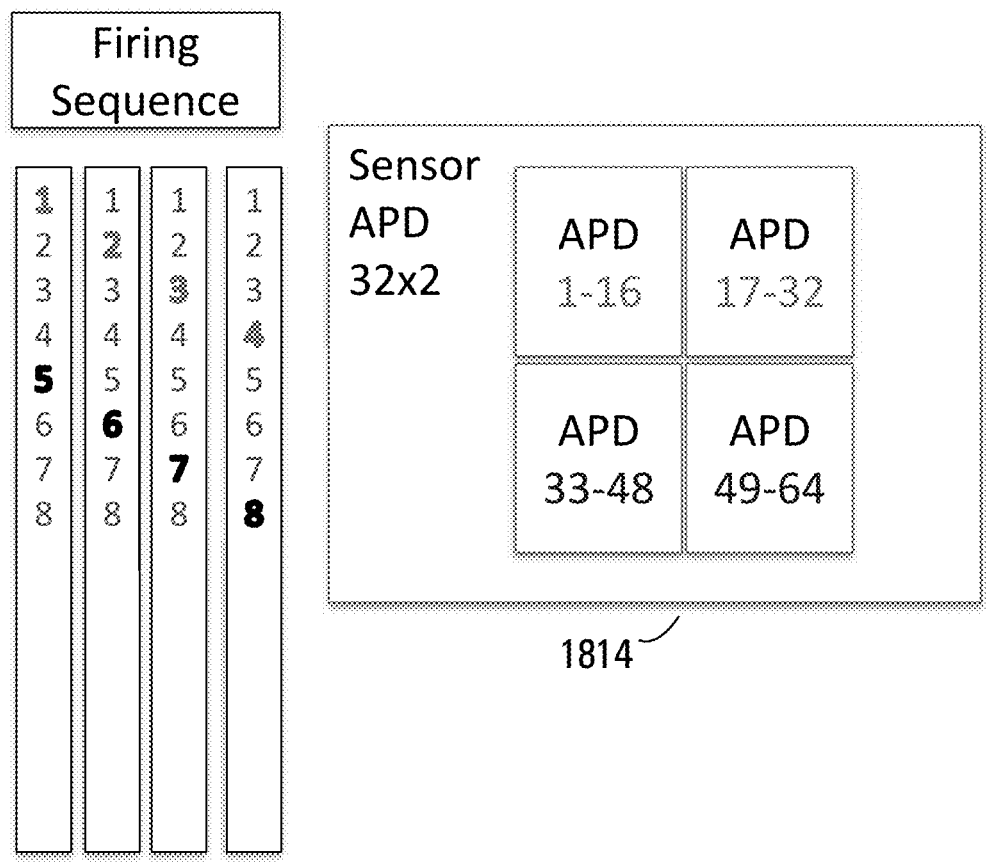
FIG. 20 shows the firing sequence for the light source and the configuration of the sensor unit of the LiDAR system of FIGS. 18 and 19.

FIG. 20 shows an example of such a firing sequence for the 8-channel laser light source 1810 and the corresponding configuration of the sensor unit 1814 of the LiDAR system 1800 of FIGS. 18 and 19. In particular, in this example, firing sequence is such that the following pairs of laser channels are fired together: 1 and 5, 2 and 6, 3 and 7, 4 and 8. Other variations are possible and are contemplated within the scope of the present disclosure. In this configuration, laser channels 1-4 optically correspond to the top 32×1 APDs of the sensor unit 1814 and laser channels 5-8 optically correspond to the bottom 32×1 APDs of the sensor unit 1814. Here it is noted that by utilizing 32 APDs to measure each of eight generally uniform horizontal segments across a horizontal FoV that spans substantially 180°, the resulting generally uniform horizontal resolution is approximately 0.7°.

Figure 21:
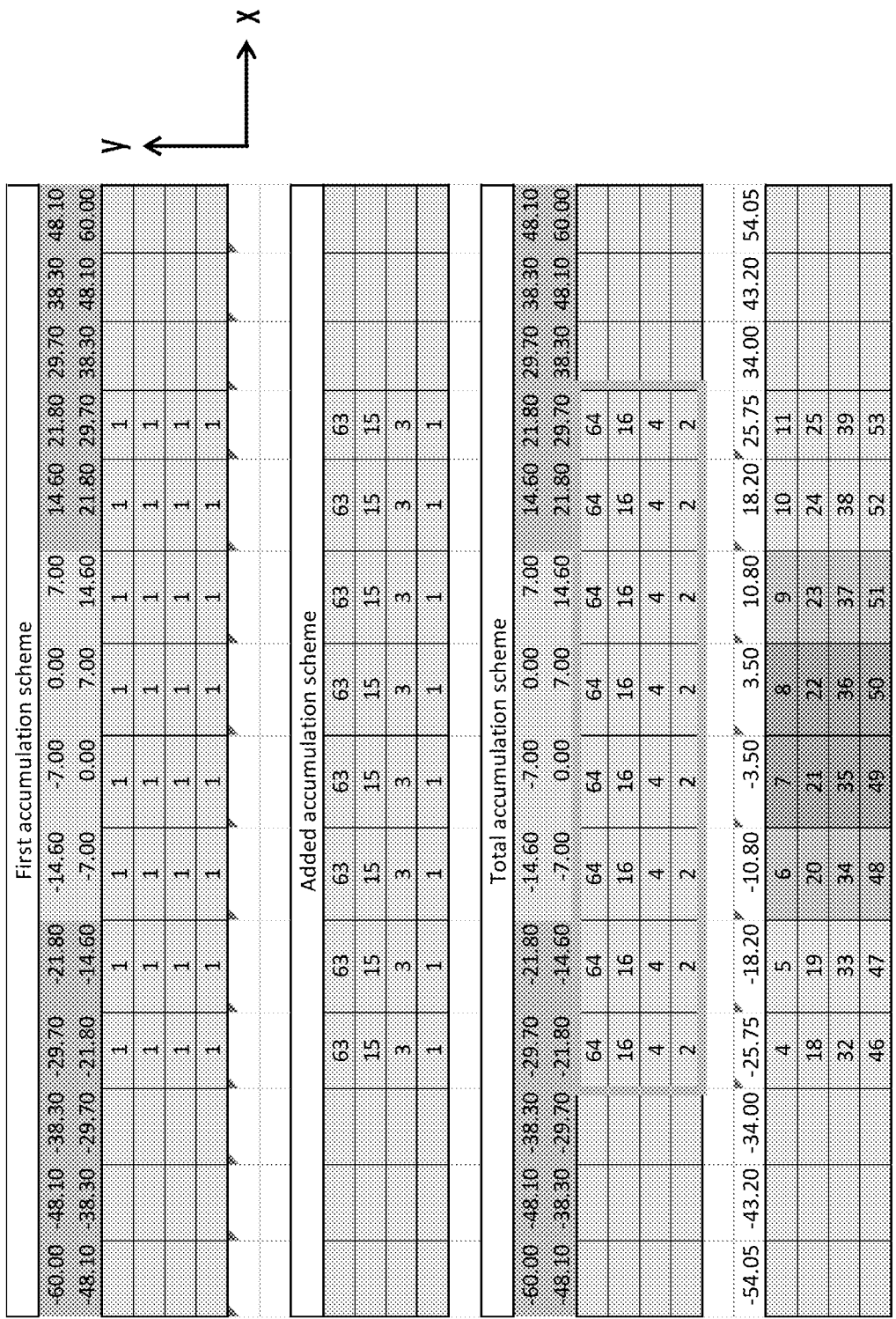
FIG. 21 shows an example of an accumulation strategy for the segments of the segmented FoV represented by the steering angle configurations of the LCPG of the LiDAR system of FIGS. 18 and 19.

FIG. 21 shows an example of an accumulation strategy for the segments of the segmented FoV 1100 represented by the steering angle configurations of the LCPG beam steering device 1806 of the LiDAR system 1800 of FIGS. 18 and 19. In this example, the analysis starts with a single accumulation in each tile. Additional acquisitions may then be done in active tiles with potentially more accumulations being done in tiles within specific regions of interest. In this example, more accumulations are performed in the top row of tiles, which represents the segments having the highest vertical resolution (i.e., the top eight segments of the segmented FoV 1100 of FIG. 11), with progressively fewer accumulations in each subsequent row of tiles.

Figure 22:
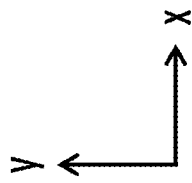
FIG. 22 shows an example of another accumulation strategy for the segments of the segmented FoV with unequal accumulations along the horizontal direction.

In the example shown in FIG. 21, there are an equal number of accumulations in the horizontal direction of each row of tiles. However, in some cases, depending on the magnification factor and the effective aperture, the accumulations across the horizontal axis could be changed, e.g., to favor the front direction of the vehicle by performing more accumulations in the horizontal direction towards the front of the vehicle. For example, FIG. 22 shows an example of another accumulation strategy for the segments of the segmented FoV with unequal accumulations along the horizontal direction.

In the example LiDAR system 1800 shown in FIGS. 18 and 19, emission and reception functions utilize the same LCPG beam steering device 1806 and magnification optics 1802. However, other configurations of the optical emission and reception paths are possible and are contemplated within the scope of the present disclosure.

Figure 23:
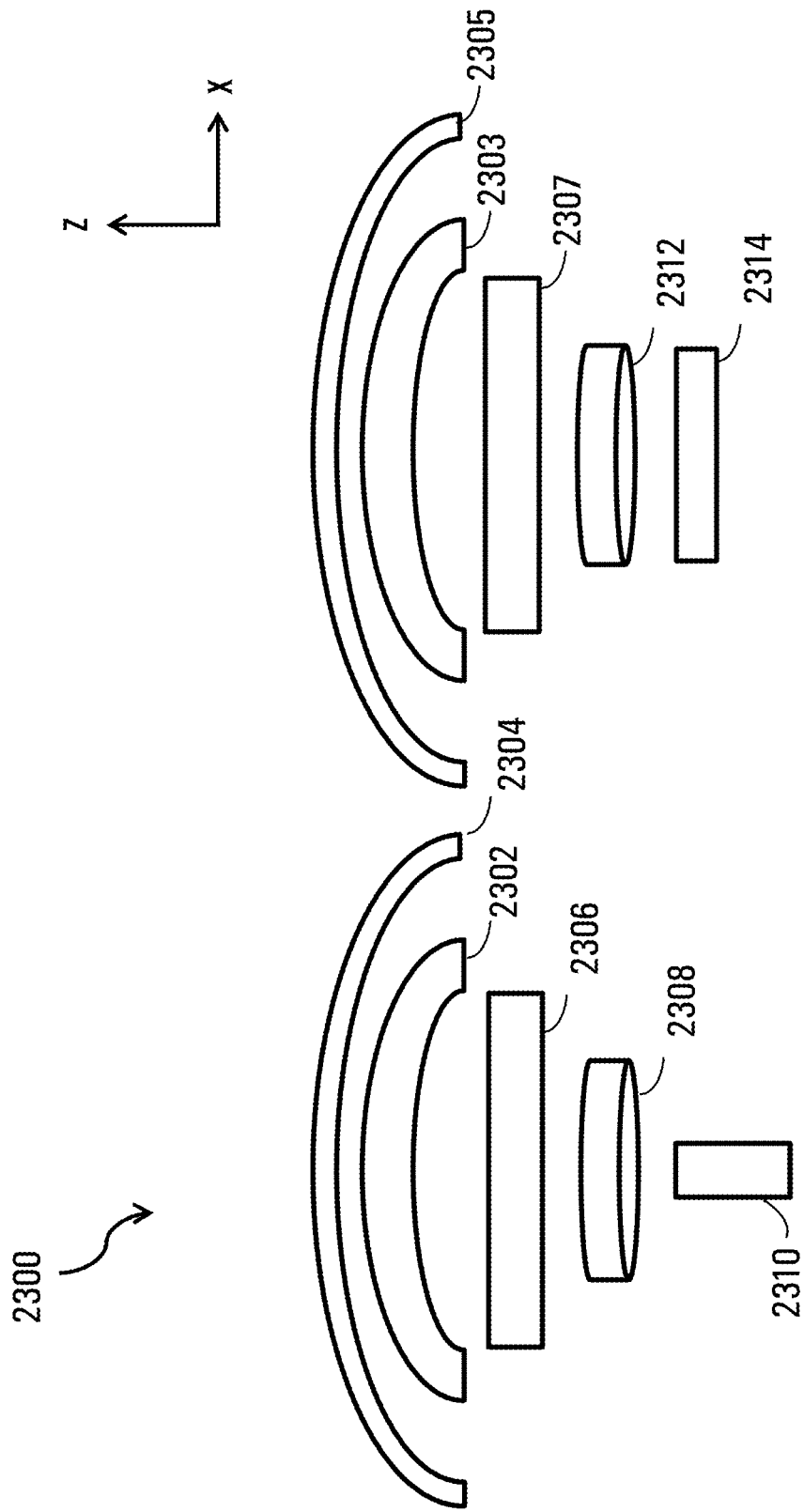
FIG. 23 shows a top down view of an example of a LiDAR system with non-uniform magnification optics in which the emitter module and the reception module have separate magnification optics.

For example, FIG. 23 shows a top down view of an example of a LiDAR system 2300 with non-uniform magnification optics in which the emitter module and the reception module have separate magnification optics. In particular, in the example embodiment shown in FIG. 23, a laser light source 2310, emission optics 2308 and an emission beam steering device 2306 are behind a first non-uniform magnification optics 2302 and protective cover 2304, and a sensor unit 2314, reception optics 2312 and reception beam steering device 2307 are behind a second non-uniform magnification optics 2303 and protective cover 2305. This configuration may provide more range, but potentially at the cost of a larger physical footprint. In some embodiments, a single protective cover may be used to cover both magnification optics 2302 and magnification optics 2303. In other embodiments, one or both of the protective covers 2304 and/or 2305 may be omitted. As in the previous examples, a number of components of the LiDAR system 2300 have been omitted from the illustration in the interest of clarity.

Figure 24:
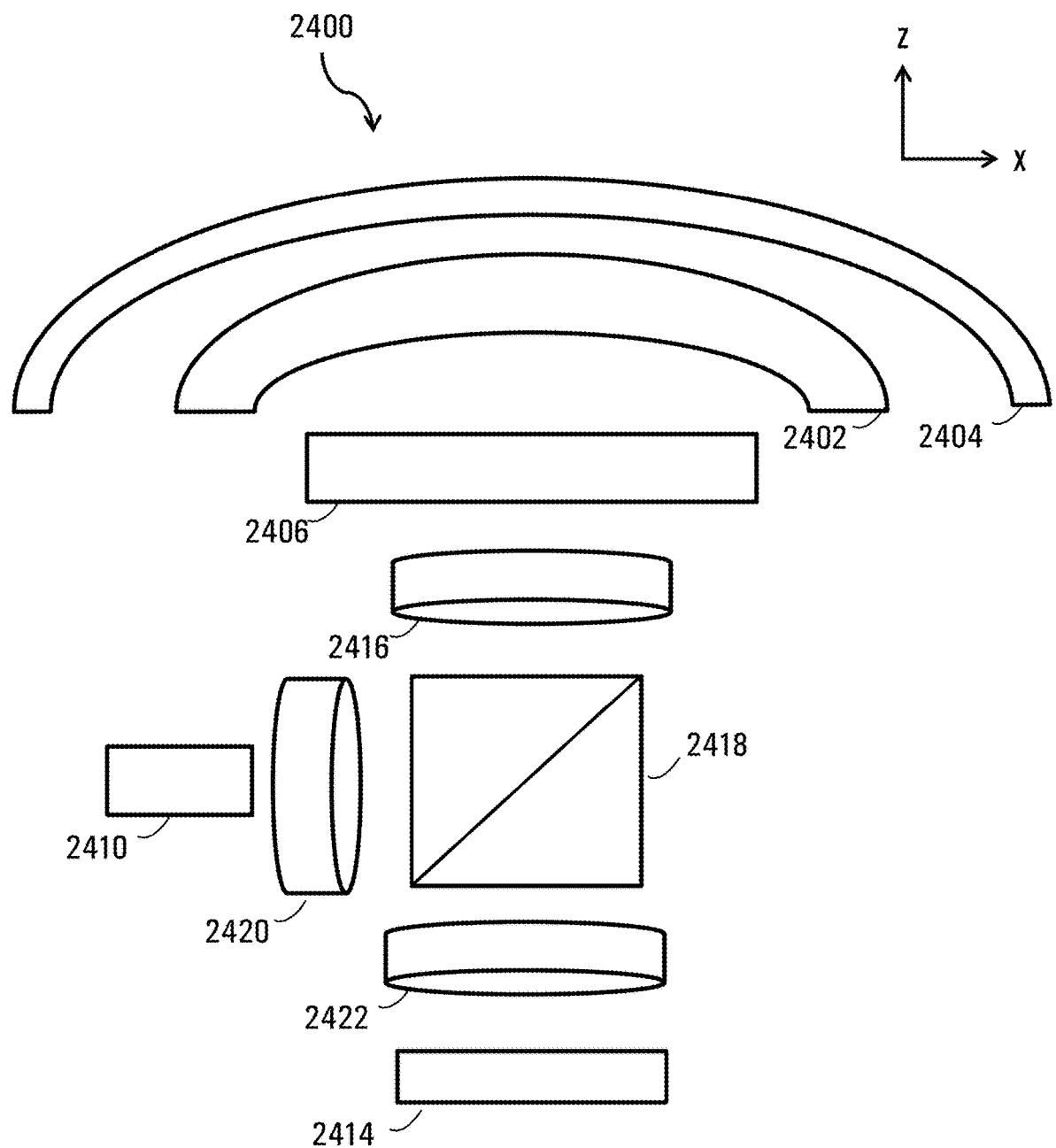
FIG. 24 shows a top down view of an example of a LiDAR system with non-uniform magnification optics in which the optical emitter and reception paths are co-axial.

As another example, FIG. 24 shows a top down view of an example of a LiDAR system with non-uniform magnification optics in which the optical emitter and reception paths are co-axial. In particular, in the example embodiment shown in FIG. 24, an optical path that includes a protective cover 2404, outer non-uniform magnification optics 2402, a bead steering device 2406 and inner uniform magnification optics 2416 is then split by a polarization beam splitter (PBS) 2418 towards an emitter module that includes emission optics 2420 and a laser light source 2410 and a reception module that includes reception optics 2422 and a sensor unit 2414. This configuration may provide a smaller footprint than the previous embodiments and may provide better short range performance, but losses due to the PDS 2418 may limit its range. In some embodiments, the protective cover 2404 may be omitted. As in the previous examples, a number of components of the LiDAR system 2400 have been omitted from the illustration in the interest of clarity.

In the examples discussed above with reference to the LiDAR system 1800 of FIGS. 18 and 19, the beam steering device 1806 was implemented with an LCPG device. However, as discussed previously, in other embodiments beam steering may be done via a different type of beam steering device and/or in conjunction with two or more different types of beam steering device. In still other embodiments, the light signals magnified via non-uniform magnification optics may not receive active optical steering prior to being non-uniformly magnified via the non-uniform magnification optics.

Figure 25:
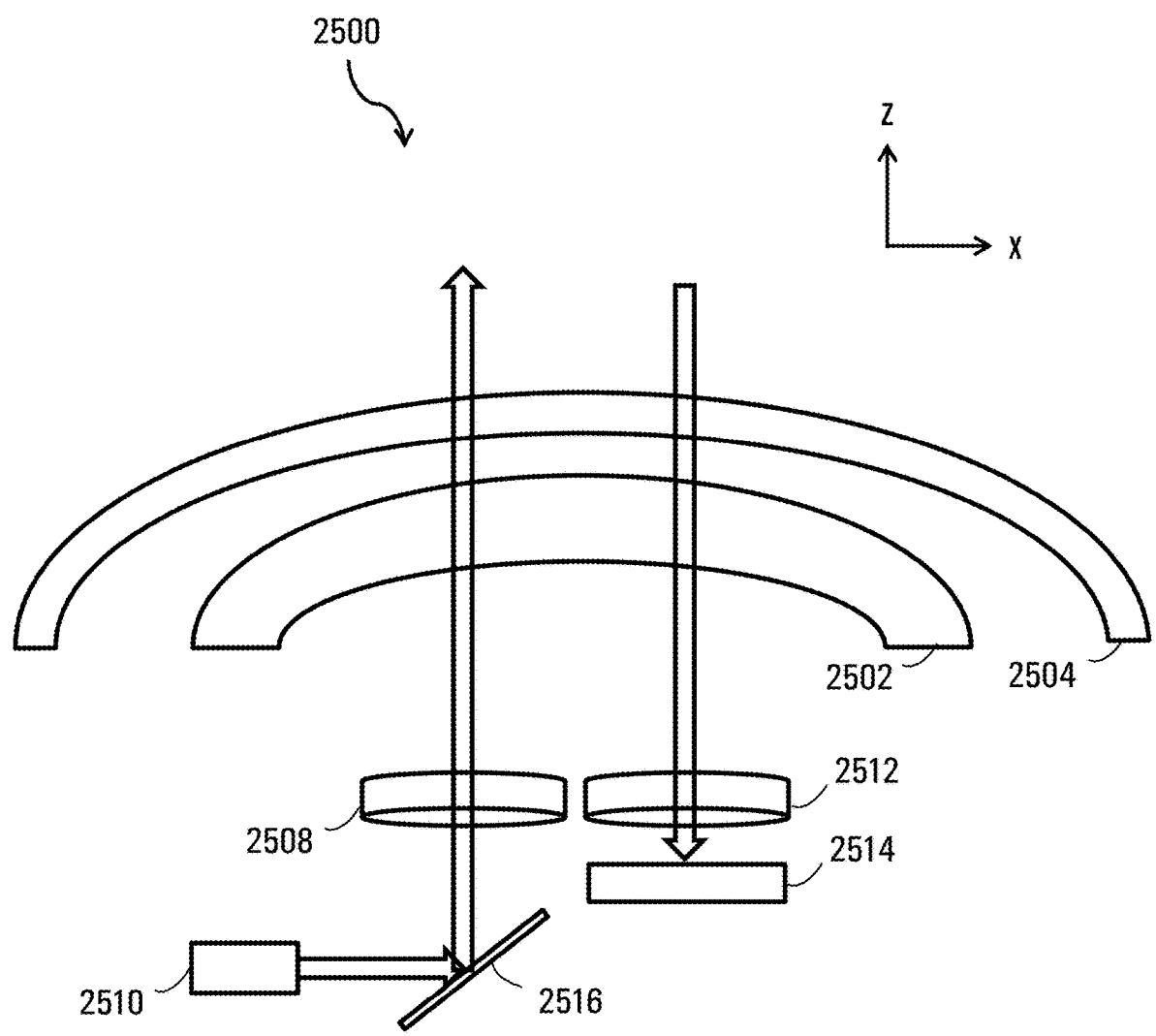
FIG. 25 shows a top down view of an example of a LiDAR system with non-uniform magnification optics and a beam steering device implemented by a MEMS device.

For example, FIG. 25 shows a top down view of an example of a LiDAR system 2500 with non-uniform magnification optics 2502 and a beam steering device implemented by a MEMS device 2516. In particular, the LiDAR system 2500 includes a laser light source 2510 arranged to transmit laser light onto MEMS device 2516, which reflect the laser light through emission optics 2508 and from there the emitted light beam is magnified by non-uniform magnification optics 2502. As in the previous example, a protective cover 2504 overs magnification optics 2502, but the protective cover 2504 may be omitted in some embodiments. On the reception side, a sensor unit 2514 receives reflected optical signals from the LiDAR system's FoV through magnifying optics 2502 and reception optics 2512. The MEMS beam steering device 2516 may be any type of MEMS device that is capable of steering an optical signal with sufficient energy density to be useful for LiDAR applications. For example, MEMS micro-mirrors can steer light continuously by at least ±30°. As in the previous examples, a number of components of the LiDAR system 2500 have been omitted from the illustration in the interest of clarity.

In some embodiments, two beam steering devices, such as an LCPG beam steering device and a MEMS beam steering device, may be used in conjunction with one another to provide coarse and fine scanning functions. For example, a MEMS beam steering device may be used for fine scanning with a coarse scanning segment of an LCPG beam scanning device.

Figure 26:
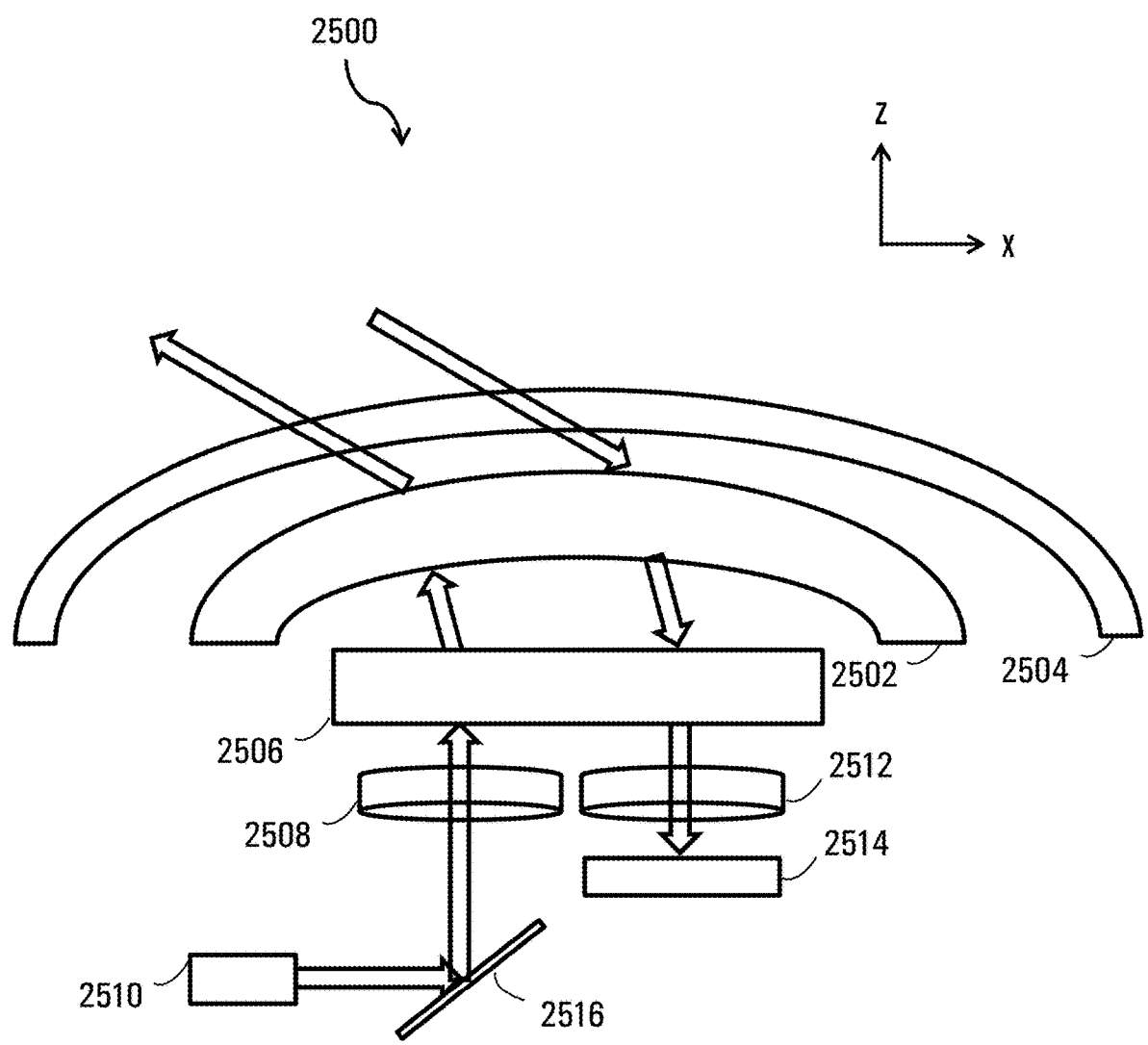
FIG. 26 shows a top down view of an example of a LiDAR system with non-uniform magnification optics and a beam steering device implemented by an LCPG and a MEMS device.

As one example, FIG. 26 shows a top down view of the LiDAR system 2500 of FIG. 25 with an added LCPG beam steering device 2506 between the emission optics 2508 and the non-uniform magnification optics 2502. It is noted that in this example the LCPG beam steering device 2506 also provides reception beam steering functionality for sensor unit 2514. In this example, the LCPG beam steering device 2506 may provide coarse horizontal beam steering between and the MEMS beam steering device 2516 may provide fine scanning within each coarse segment of the LCPG beam steering device 2506. In some embodiments, the MEMS beam steering device 2516 may be implemented by a 1-D resonant MEMS device.

Figure 27:
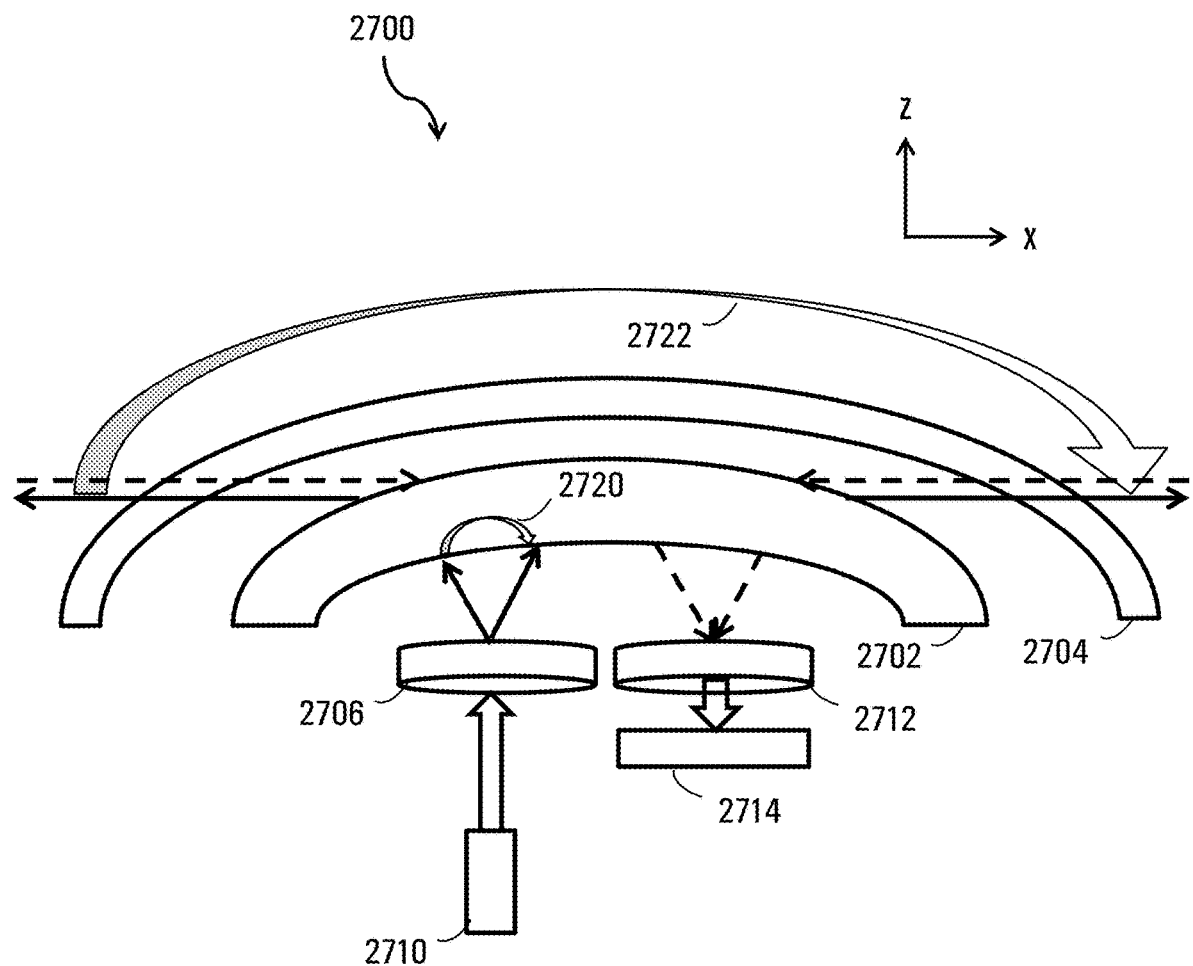
FIG. 27 shows a top down view of an example of a LiDAR system with non-uniform magnification optics and a FLASH structure for optical beam dispersal.

FIG. 27 shows a top down view of an example of a LiDAR system 2700 with non-uniform magnification optics 2702 and a FLASH structure for optical beam dispersal. In particular, in the LiDAR system 2700 shown in FIG. 27, the emitter module includes a laser light source 2710 and emission optics 2706 that horizontally diffuse laser light from the laser light source 2710 over first horizontal angular range 2720 that is then further magnified to a second wider horizontal angular range 2722 by the magnification optics 2702. The laser light source 2710 may be a multi-channel laser light source similar to the 8 channel laser light source 1810 of the LiDAR system 1800 of FIGS. 18 and 19. In such embodiments, the non-uniform magnification optics 2702 may non-uniformly distribute the horizontally diffused laser light from each of the different laser channels at non-uniformly spaced vertical angles to provide a non-uniform vertical resolution over the FoV of the LiDAR system 2700. On the reception side, a sensor unit 2714 receives reflected optical signals from the LiDAR system's FoV through magnifying optics 2702 and reception optics 2712. Such embodiments may be well suited to lower power/lower range applications, such as in mobile devices where high power LEDs may even be used rather than a higher powered laser light source like the laser light source 2710. As in the previous example, a protective cover 2704 overs magnification optics 2702, but the protective cover 2704 may be omitted in some embodiments. As in the previous examples, a number of components of the LiDAR system 2700 have been omitted from the illustration in the interest of clarity.

Figure 28:
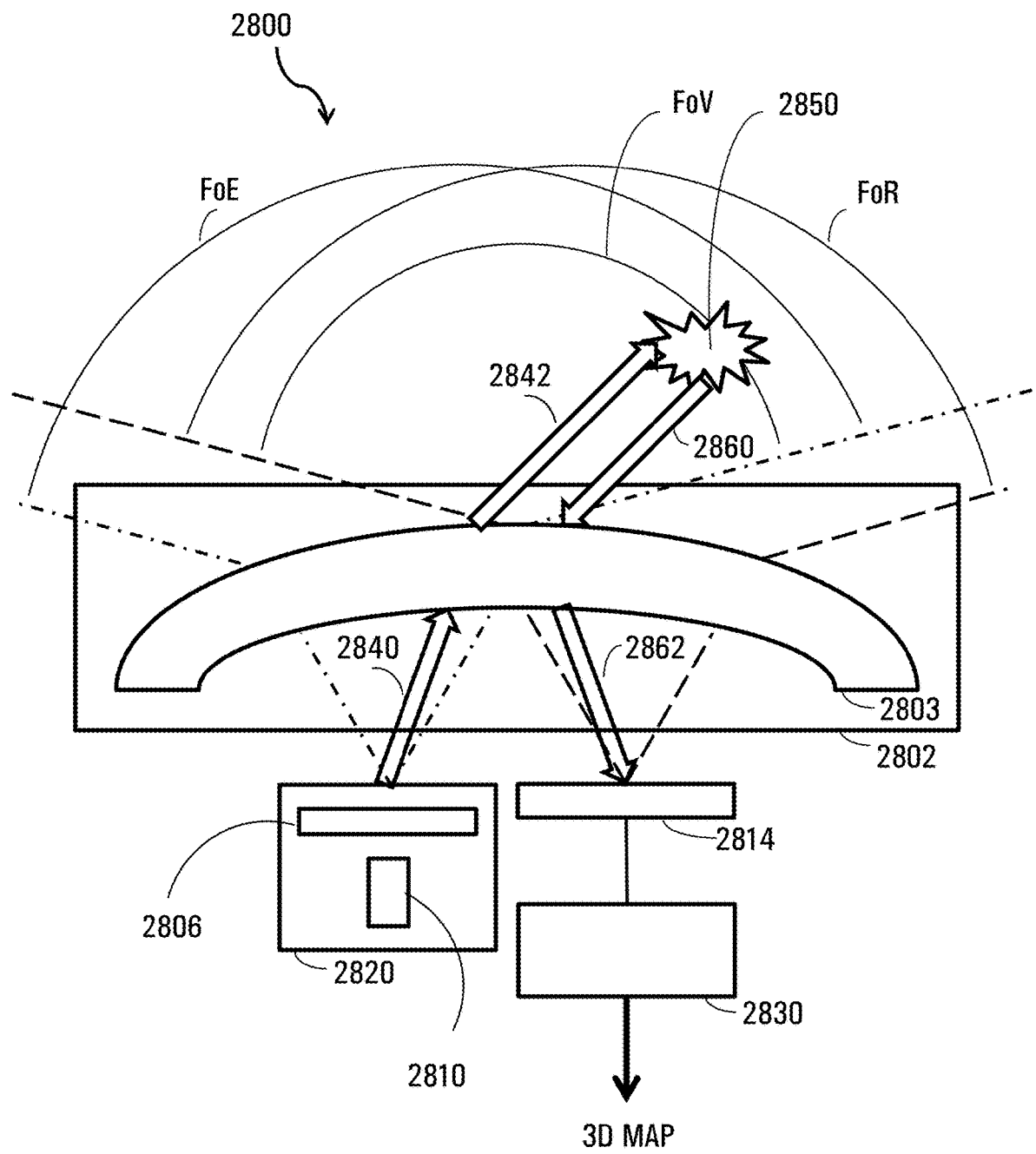
FIG. 28 shows another example of a LiDAR system with non-uniform magnification optics according to an embodiment of the present disclosure.

FIG. 28 shows another example of a LiDAR system 2800 with non-uniform magnification optics 2802 according to an embodiment of the present disclosure. In addition to the non-uniform magnification optics 2803, the LiDAR system 2800 of FIG. 28 includes an emission unit 2820, a sensor unit 2814 and a computer device 2830. The emission until 2820 is configured for emitting an optical signal that illuminates at least part of a FoV of the LiDAR system 2800. In particular, the emission unit 2820 emits an optical signal that illuminates a field of emission (FoE) that at last partially overlaps with a field of reception (FoR) from which the sensor unit receives optical signals. The FoV is defined as the area of overlap between the FoE and FoR. In operation, an optical signal 2840 emitted by emission unit 2820 is refracted by non-uniform magnification optics such that there is a non-linear relationship between the angular orientation of the emitted optical signal 2840 along at least one axis (e.g., a vertical axis and/or horizontal axis) relative to the angular orientation of an outwardly emitted signal 2842 resulting from the refraction (angular magnification) of the non-uniform magnification optics 2802. For example, the magnification optics may have an image point distribution function that is non-linear relative to a vertical field angle of object points in the FoV. In this embodiment, the magnification optics 2802 is configured for receiving an optical signal 2860 that is a version of the emitted optical signal 2842 reflected from at least one object in the FoV (as indicated at 2850 in FIG. 28). In this embodiment, the magnification optics refract the received reflected optical signal 2860 towards the sensor unit 2814, which is configured for processing the received optical signal 2862 and outputting a depth map of the FoV. For example, if the magnification optics 2802 has an image point distribution function that is non-linear relative to a vertical field angle of object points in the FoV, then the depth map may have at least one substantially expanded zone and at least one substantially compressed zone in the vertical direction. In some embodiments, the sensor unit 2814 may receive optical signals and obtain optical measurements based thereupon, but the processing and outputting of the depth map may be carried out by computing device 2830 based upon the measurements obtained by sensor unit 2814. In some embodiments, the computer device 2830 may also provide control signals to emission unit 2806 in order to coordinate the emission and reception functions.

In some embodiments, the magnification optics 2802 comprises an objective lens 2803, wherein the sensor unit 2814 comprises a plurality of sensor elements placed in an image plane of the objective lens 2803. For example, the sensor unit 2814 may include an array of APDs as described earlier with reference to FIG. 20. In such embodiments, if the magnification optics 2802 has an image point distribution function that is non-linear relative to a vertical field angle of object points in the FoV, then a number of sensor elements per degree of vertical field angle may differ over portions of the FoV by more than 10% relative to the average number of sensor elements per degree of vertical field angle over the total FoV in the vertical direction.

In some embodiments, if the magnification optics 2802 has an image point distribution function that is non-linear relative to a vertical field angle of object points in the FoV and the depth map may have at least one substantially expanded zone and at least one substantially compressed zone in the vertical direction, then the objective lens and the plurality of sensor elements may be configured such that, in each substantially expanded zone, a number of sensor elements per degree of vertical field angle is greater than the average number of sensor elements per degree of vertical field angle over the total FoV in the vertical direction and, in each substantially compressed zone, the number of sensor elements per degree of vertical field angle is less than the average number of sensor elements per degree of vertical field angle over the total FoV in the vertical direction.

In the LiDAR system 2800 shown in FIG. 28, the emitted optical signal 2840 passes through the magnification optics 2840 and is refracted thereby before illuminating at least part of the FoV. However, in other embodiments, magnification optics may only be used to receive optical signals from the FoV or magnification optics different from those used for optical signal reception may be used for emission.

In some embodiments, the LiDAR system 2800 may include inner magnification optics between the emission module 2820 and the magnification optics 2802, such that the optical signal 2842 passes through two magnification optics before illuminating at least part of the FoV.

In some embodiments, the depth map is an original depth map, wherein the sensor unit or the computing device 2830 is configured for correcting the original depth map for the non-linear distribution function to produce a new depth map in which the substantially compressed zone in the original depth map is expanded in the new depth map and in which the substantially expanded zone in the original depth map is compressed in the new depth map.

In some embodiments, the new depth map comprises pixels and wherein at least some of the pixels in a portion of the new depth map corresponding to an expanded version of a substantially compressed zone in the original depth map are interpolated pixels.

In some embodiments, the sensor unit is configured for processing the depth map to determine a location of the object in the FoV and a distance to the object in the FoV.

In some embodiments, the LiDAR system 2800 further includes a beam steering unit 2806 for orienting the optical signal towards the FoV in a selected one of a plurality of directions. For example, the beam steering unit 2806 may be part of the emission unit 2820 as shown in FIG. 28, or it may be a component that is shared with the reception path to provide received beam steering between the magnification optics 2802 and the sensor unit 2814.

In some embodiments, each of the steering directions is associated with a respective sub-area of the FoV.

In some embodiments, the beam steering unit 2806 is a solid-state beam steering unit. For example, the beam steering unit 2806 may comprise an LCPG.

In some embodiments, the beam steering unit comprises a multi-stage system. For example, one stage of the multi-stage system may comprise an LCPG.

In some embodiments, the magnification optics is configured for magnifying a range of angles illuminated by the emitted optical signal.

In some embodiments, the emission unit 2820 is configured for controllably emitting a selected one of a plurality of optical beams as the emitted optical signal 2840.

In some embodiments, each of the plurality of optical beams is oriented in a predetermined direction.

In some embodiments, the FoV comprises a vertical component and a horizontal component, wherein the FoV spans at least 60 degrees in the vertical direction between horizon and ground.

In some embodiments, the FoV spans at least 150 degrees in the horizontal direction.

In some embodiments, the image point distribution function is substantially linear relative to a horizontal field angle of object points in the FoV. In other embodiments, the image point distribution function of the magnification optics 2820 is non-linear relative to a horizontal field angle of object points in the FoV. For example, the image point distribution function may be symmetric relative to a horizontal field angle of object points in the FoV.

Figure 29:
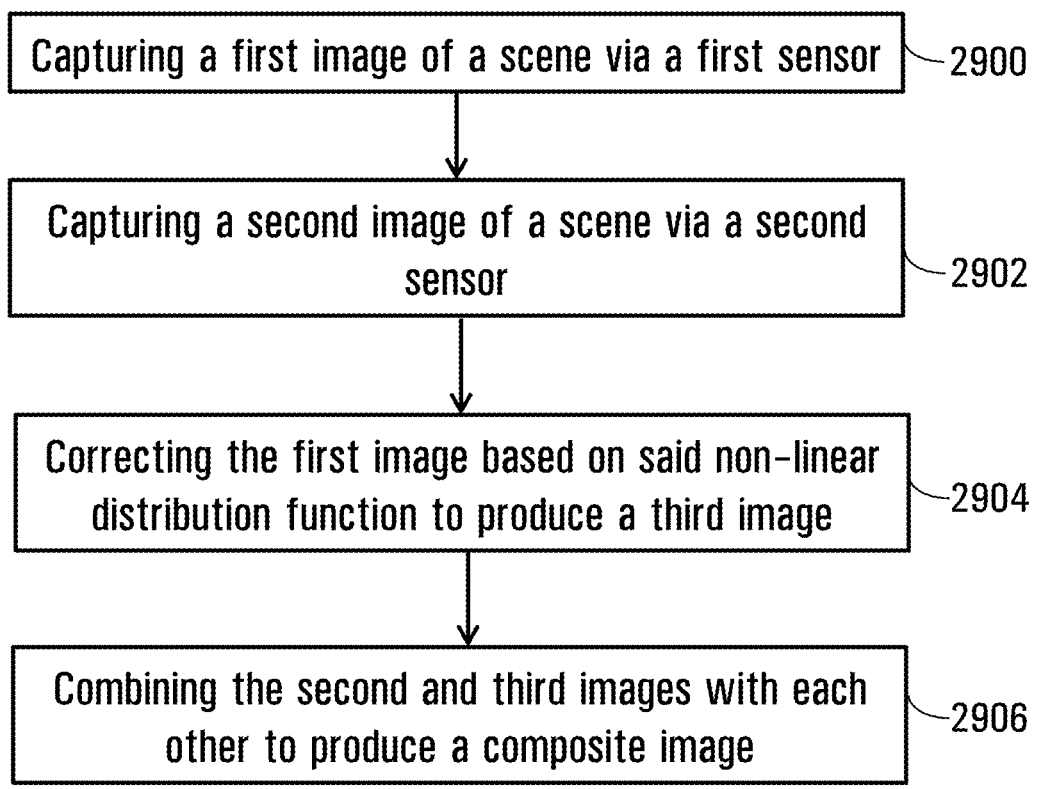
FIG. 29 shows a flowchart of a method according to another embodiment of the present disclosure.

FIG. 29 shows a flowchart of a method according to another embodiment of the present disclosure.

At step 2900 of the method a first image of a scene is captured via a first sensor.

At step 2902, a second image of the scene is captured via a second sensor different from the first sensor. The first and second images overlap to include at least one common FoV. In some embodiments, the first image comprises pixels that are distributed in accordance with a non-linear image point distribution function relative to a field angle of object points of the FOV. In some embodiments, one of the first and second images is a depth map.

At step 2904, the first image is corrected based on said non-linear distribution function to produce a third image.

AT step 2906, the second and third images are combined with each other to produce a composite image including information from the second image and information from the third image.

In some embodiments, the image point distribution function is non-linear in the vertical direction between horizon and ground.

In some embodiments, the image point distribution function has a maximum divergence of at least ±10% compared to a linear distribution function, in the vertical direction.

In some embodiments, the image point distribution function is substantially linear in the horizontal direction.

In some embodiments, the third image has more pixels than the first image.

In some embodiments, some of the pixels of the third image correspond directly to pixels of the first image and wherein other ones of the pixels of the third image correspond to interpolated versions of some of the pixels of the first image.

In some embodiments, the method may further include interpolating said some of the pixels of the first image to produce said other ones of the pixels in the third image.

In some embodiments, the other one of the first and second images is a 2D camera image.

In some embodiments, the first sensor comprises an array of photodiodes and wherein the second sensor comprises a digital camera.

In some embodiments, the second image comprises pixels that are distributed in accordance with a substantially linear distribution function relative to a field angle of object points of the FOV.

In some embodiments, the FOV comprises a vertical FOV and a horizontal FOV.

In some embodiments, the vertical FOV spans at least 60 degrees and the horizontal FOV spans at least 150 degrees.

In some embodiments, the image point distribution function being non-linear relative to a field angle of object points in at least the vertical FOV.

In some embodiments, the image point distribution function is non-linear relative to a field angle of object points in both the horizontal FOV and the vertical FOV.

In some embodiments, the composite image is an RGBD image.

In some embodiments, the first image comprises at least one substantially compressed zone and at least one substantially expanded zone, and wherein correcting the first image comprises at least one of (i) compressing the substantially expanded zone and (ii) expanding the substantially compressed zone, to produce the third image.

In some embodiments, capturing the second image of the scene at step 2902 is carried out by sequentially capturing different subportions of the FOV as illuminated by an optical signal emitted in a controllable direction.

Figure 30:
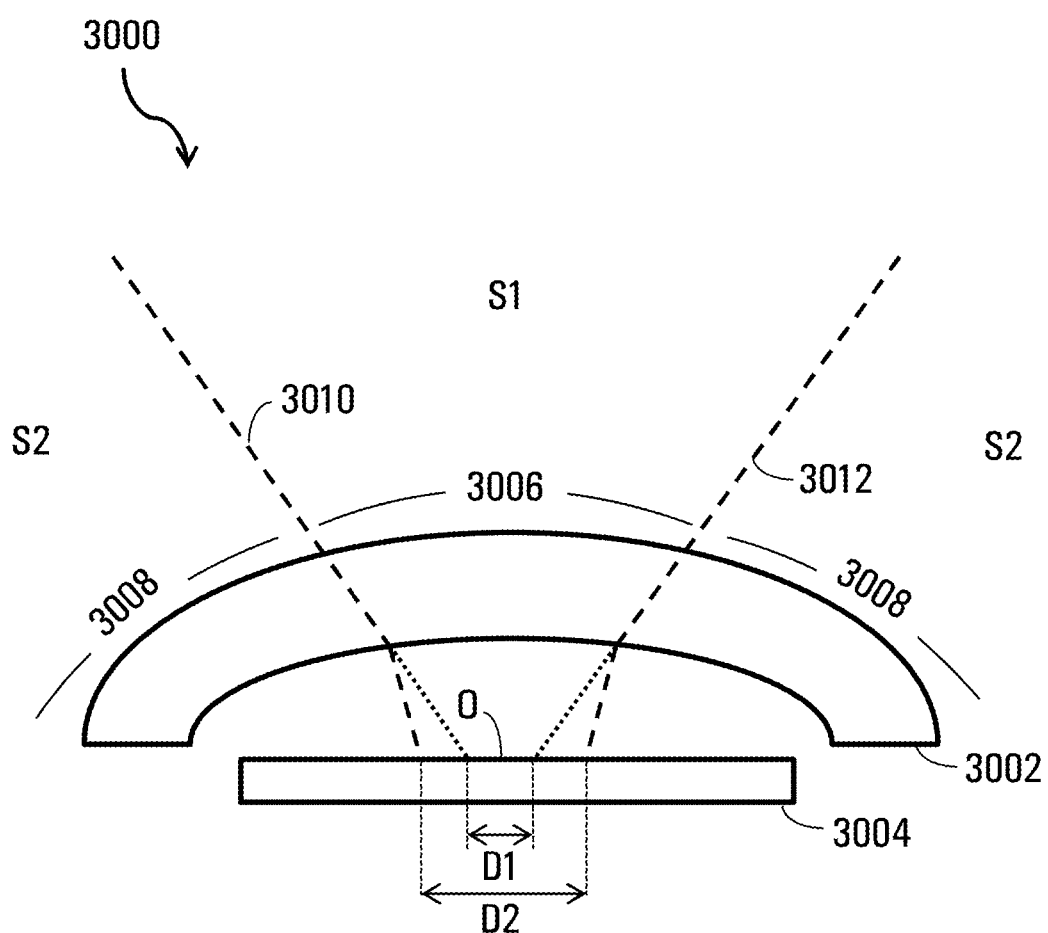
FIG. 30 shows another example of a LiDAR system with non-uniform magnification optics according to an embodiment of the present disclosure.

FIG. 30 shows another example of a LiDAR system with non-uniform magnification optics according to an embodiment of the present disclosure. In particular, FIG. 20 is a vertical cross-sectional view of a LiDAR system using wide-angle magnification optics. A number of components of the LiDAR system 3000 have been omitted from the illustration in the interest of clarity.

The LiDAR system 3000 has a wide-angle magnification optics 3002 and a light sensor 3004. What is being shown in FIG. 30 is effectively the receiver side of the LiDAR system 3000, it being understood that for a functional LiDAR system to generate a three-dimensional LiDAR representation of the geographical area or scene, an emission side is required to generate a light signal that will illuminate the geographical area and produce optical returns that are sensed by the receiver side.

The wide-angle magnification optics achieves a wide-angle field of view. By "wide-angle' is meant an optical aperture of at least 150 degrees in some axis, for example a horizontal axis. Preferably the angular aperture is close to 180 degrees. This is advantageous in automotive applications where the LiDAR system enables autonomous driving or driving facilitation functions and 180 degrees of angular aperture would allow a wide enough view of the road. Note that in a number of applications of the LiDAR system, the angular aperture may be constant in all directions, such as in the horizontal direction or the vertical direction. In other applications, the angular aperture may vary, for instance it may be larger in the horizontal direction and narrower in the vertical direction. The later variant is useful in automotive applications where a wide horizontal view of the road is important, but a wide vertical view of the road is not as essential.

The light returns that reach the lens 3002 are projected on the light sensor 3004. The configuration of the lens 3002 is selected to adapt the light projection on the light sensor 3004 in order to provide advantages. Particularly, the lens 3002 is configured to project a representation of the scene conveyed by the light return by compressing a portion of that representation while expanding other portions. For example, a portion of the representation that may be expanded is one which is more susceptible to contain objects of interest, while a portion of the representation that may be compressed is one which is less susceptible to contain objects of interest. In automotive applications, where the LiDAR system 3000 has a view of the road, the central part of the field of view of the LiDAR system 3000 is where objects of interest are likely to reside, such as automobiles, pedestrians or obstacles. The peripheral part of the field of view is less likely to contain objects of interest. As a car drives on a road, most of the driving decisions are influenced by the what happens ahead, not on the side, hence it is important for the LiDAR system 3000 to have the best visibility in that area.

However, there may be other applications where it is more important to have a good peripheral vision than a central one. In such applications, the lens 3002 would be configured differently to manipulate the light return such as to expand the peripheral area of the light return and compress the central area of the light return.

The selective expansion and compression of the light return is accomplished by selecting the lens geometry to achieve the desired effect. This is illustrated with greater detail at FIG. 30. Assume for the purpose of this example that the lens 3002 is a hemispherical lens and provides 180 degrees of optical aperture overall. The lens 3002 receives optical returns over its entire outer surface and directs those returns towards the light sensor 3004. In this example of implementation, the light sensor is made up of an array of Avalanche Photodiodes (APD) arranged in a suitable configuration. A data processor (not shown) receives the outputs of the various APDs, processes them to provide a wide-angle three-dimensional representation of the scene in front of the lens. The representation of the scene would typically be expressed as a series of points, where each point can be defined by X, Y and Z coordinates or by two angles, one in the horizontal plane, one in the vertical plane and a distance dimension from a point of reference O.

The lens 3002 has a central area 3006 and a peripheral area 3008. The central area 3006 receives a light return from an area S1 of the scene. The boundaries between S1 and S2 are conceptually shown as dotted lines 3010 and 3012. In three dimensions the lines 3010 and 3012 form a frustum of a cone.

The central area of the lens 3006 provides a higher magnification than the peripheral area 3008. The practical effect of this arrangement is to direct the light of the return signal in the cone defined by lines 3010 and 3012 over a larger surface area of the sensor 3004, than if the magnification would be the same across the lens 3002.

Figure 31:
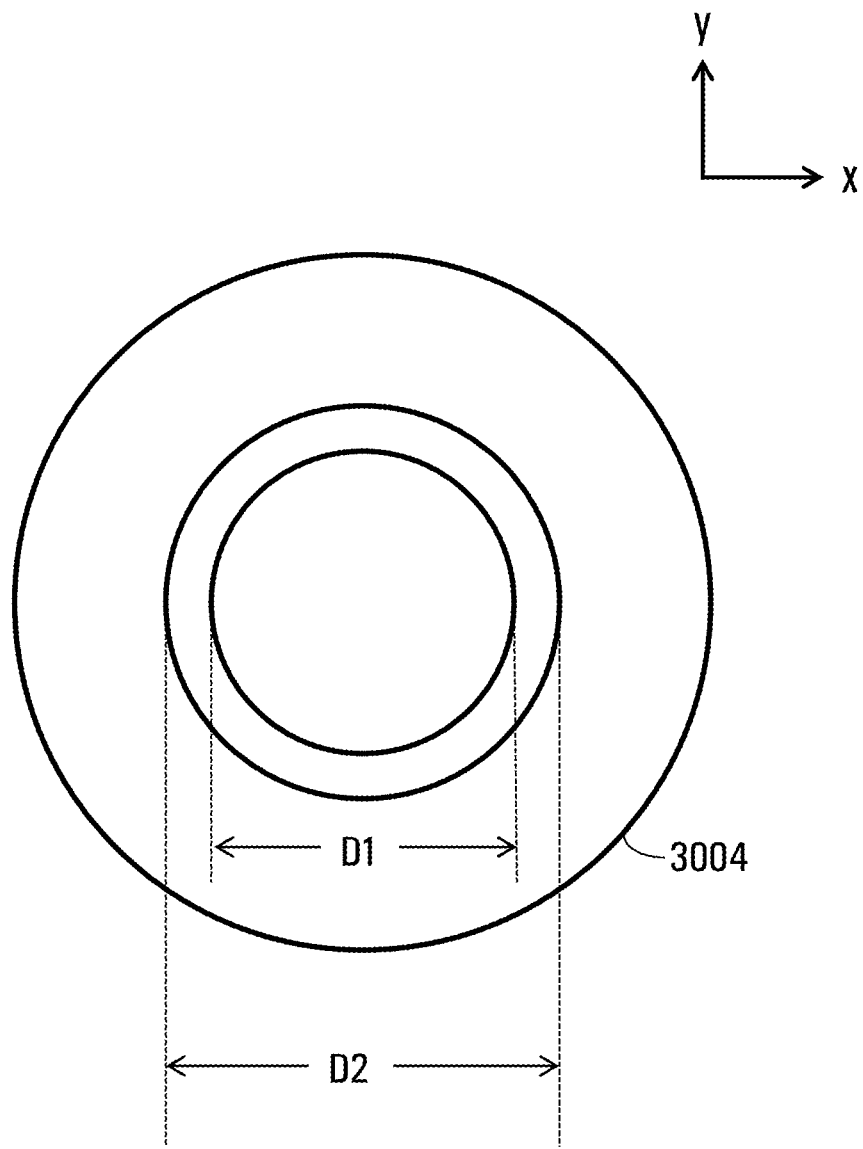
FIG. 31 shows another example of non-linearity of magnification optics implemented by a panoramic objective lens according to the present invention.

FIG. 31 is a schematical representation of the light sensor 3004, showing with concentric circles the surface area of the sensor over which the light return is spread, in the two scenarios, one where the magnification of the lens is constant and one where there is higher magnification at the center. D1 is the diameter of the circle associated with a constant magnification, while D2 is the circle associated with higher magnification in the central area 3006. D2 is larger, which implies that the light information is spread over a larger surface of the light sensor 3004.

In LiDAR architectures using a flash optical illumination, where the light return is received at once by the lens 3002, the approximate object location in the scene is determined on the basis of the position of the one or more light sensing elements on the light sensor 3004 that respond to the light return. When the light sensing elements are APDs, the position of the APDs that output a signal indicating the presence of an object provides the approximate location of the object in the scene. Accordingly, by spreading the light information over a larger portion (the circle D2) of the light sensor 3004, a better resolution is obtained as more APDs are involved in the object sensing. Thus, it is possible to tell with a higher level of precision the location in the scene where the detected objects reside.

Objectively, light received over the peripheral area 3008 is focused on a smaller portion of the light sensor 3004, which means that fewer APDs are available for sensing. This implies that the detection has lower resolution, however, the peripheral area is less likely to contain objects of interest, hence the trade-off of increasing the resolution in the center at the expense of reducing the resolution at the periphery provides practical advantages overall.

In a different LiDAR architecture, which uses a steerable illumination beam, the variable magnification lens 3002 also provides advantages. In the steerable beam architecture, the light emission can be steered to scan the scene and thus direct the light toward a particular area of the scene. A steerable beam architecture uses a beam steering engine which can be based on solid state components, mechanical components or a combination of both. Examples of solid-state components include opto-electric plates that can change the angle of propagation of light by applying a voltage. Example of mechanical components include MEMS mirrors that can change the orientation of a light beam.

Figure 32:
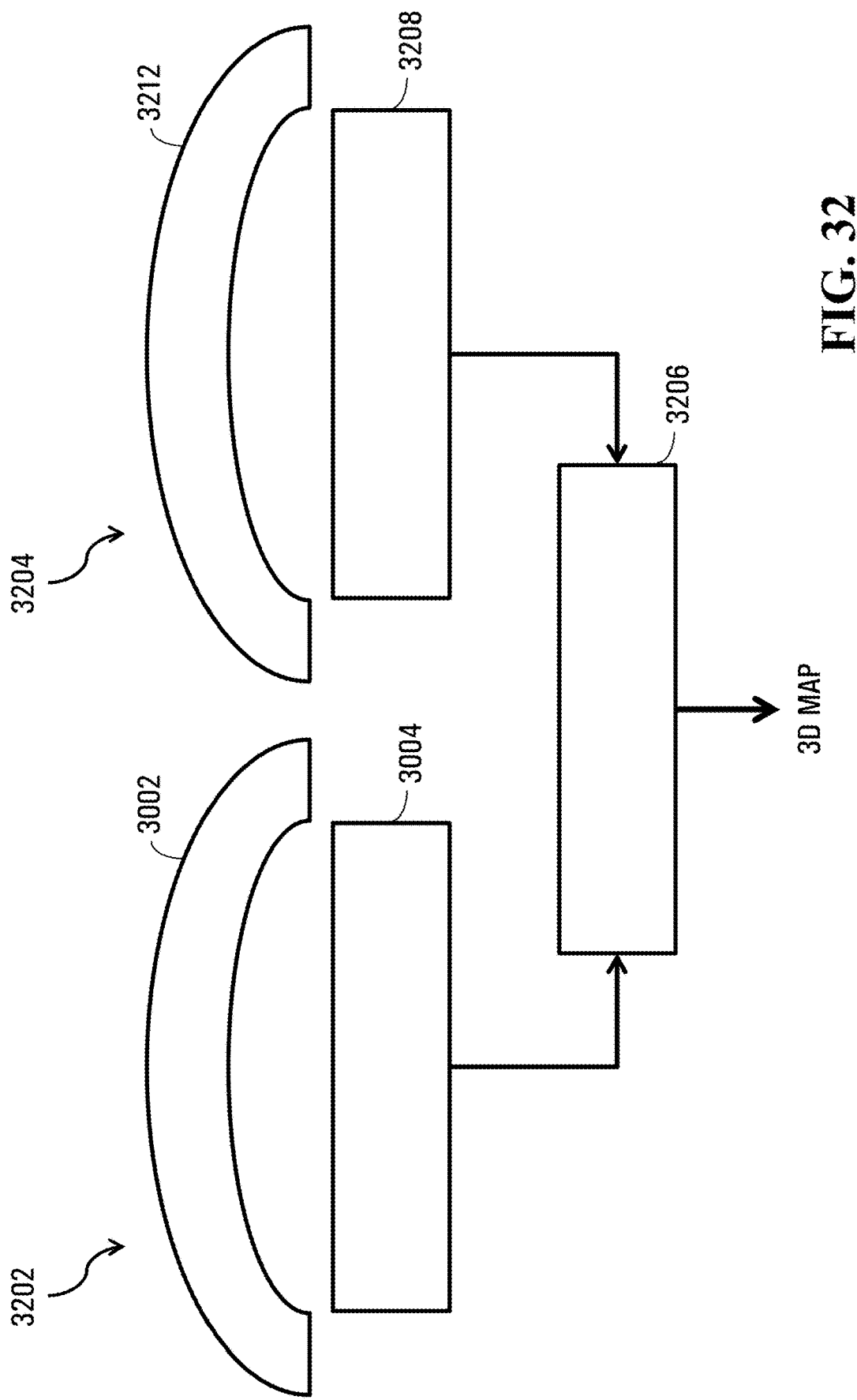
FIG. 32 shows an example of an apparatus that includes a LiDAR system and an image system, at least one of which has non-uniform magnification optics according to an embodiment of the present disclosure.

FIG. 32 illustrates the architecture of a dual sensor system, including a LiDAR system 3202 and an image system 3204. Sometimes, the LiDAR system 3202 is referred to as "active" system, while the image system 3204 is referred to as "passive" system. The LiDAR system outputs a three-dimensional representation of the scene while the image system produces a two-dimensional representation of the scene. It is known to merge the outputs of the two systems in order to provide a 3D map of the environment. Typically, this is referred as a "sensor fusion" process.

The concept of sensor fusion between a LiDAR and an image is to attribute distance measurements to individual pixels or pixel groups in the image. Hence, the 3D map can have a point cloud structure, where individual points are distributed in a space and each point has one or more other attributes such as color, transparency, etc. Since a LiDAR system operates typically at a lower resolution than an image system, it is also known to perform an upsampling operation when the LiDAR data is merged with the image data, where distance information is derived and attributed to pixels or pixels groups for which the LiDAR system does not have a direct measurement. A technique which has been proposed in the past is to rely of visual similarity in order to derive distance similarity. In other words, areas of the image which are visually similar to an area for which a distance measurement has been obtained from a LiDAR system, are assumed to be at the same or similar distance from a reference point. In this fashion, a three-dimensional representation from a lower resolution LiDAR system can be used with a high-density image to obtain a 3D map having a resolution higher than the resolution provided by the LiDAR system.

A practical approach in generating a 3D map is to determine which data points in the three-dimensional LiDAR representation, correspond to which pixels or groups of pixels in the high-density image. In other words, a registration should be achieved such that a data point in the LiDAR representation and a corresponding pixel or group of pixels represent the same object in the scene. Such registration operation is challenging in instances where the three-dimensional LiDAR representation of the environment is non-uniform, for instance as a result of using a variable magnification wide-angle lens, where some portions of the representation are at a higher resolution than others or otherwise distorted such that the distance from one data point to another in the LiDAR representation is not necessarily the same as the distance from one pixel to another in the image.

Figure 33:
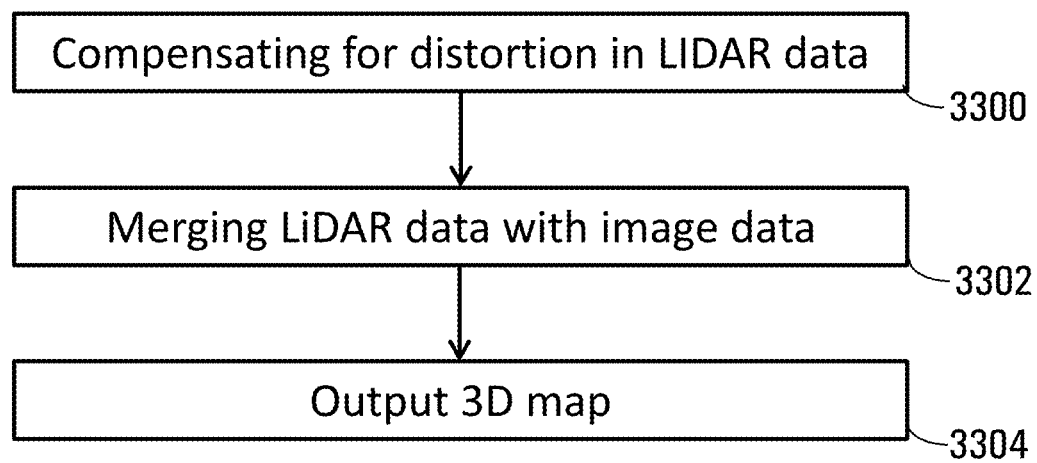
FIG. 33 shows a flowchart of a method for merging LiDAR data with image data according to another embodiment of the present disclosure.

FIG. 33 is flowchart of a computer process which compensates the three-dimensional representation for the distortion induced by the variable magnification lens in order to create an undistorted representation that is simpler to register with the image to create a sound data point to data point correspondence. The process is performed by a computer device 3206 which receives at its inputs the three-dimensional wide-angle representation of the scene from the LiDAR system 3202 and the high-density image from the image system 3204, processes them and outputs a 3D map. The computer system has a CPU which is programmed with software encoded on a non-transitory storage medium to perform the data processing illustrated at FIG. 33.

At step 3300 of the process the computer device compensates for the distortion in the three-dimensional representation of the LiDAR data. Since the distortion model is known, namely the magnification pattern of the lens, the parts of the representation that have been distorted in relation to other parts can be undistorted fully or in part. Examples of distortion correction include:

1. The portion of the image having a lower resolution can be up sampled in order to equalize the resolution across the entire representation. The up sampling can be done by interpolation between data points in the lower resolution area. No interpolation is performed in the area of the representation that is at a higher resolution.
2. Expand the image in areas that have been compressed by using the inverse of the magnification function of the lens. That will expand areas of the image in order to produce a resolution consistent with the lower resolution portion.

Alternatively, the image data can be distorted in a way which is consistent with the distortion of the LiDAR three-dimensional data, allowing to register both data sets. One way to achieve the distortion is to use a magnification lens 3212 for the image sensor 3208 which has the same magnification pattern as the lens 3002. In this fashion both data sets can be registered to establish correspondence between the data points and eventual merge. Another option is to perform the distortion through data processing by the computer device 3206.

At step 3302, the compensated LiDAR data is merged with the image data. For example, the process described in the U.S. Pat. No. 10,445,928 in the name of Vaya Vision, Ltd., the entire contents of which in incorporated herein by reference, can be used for that purpose.

Figure 34:
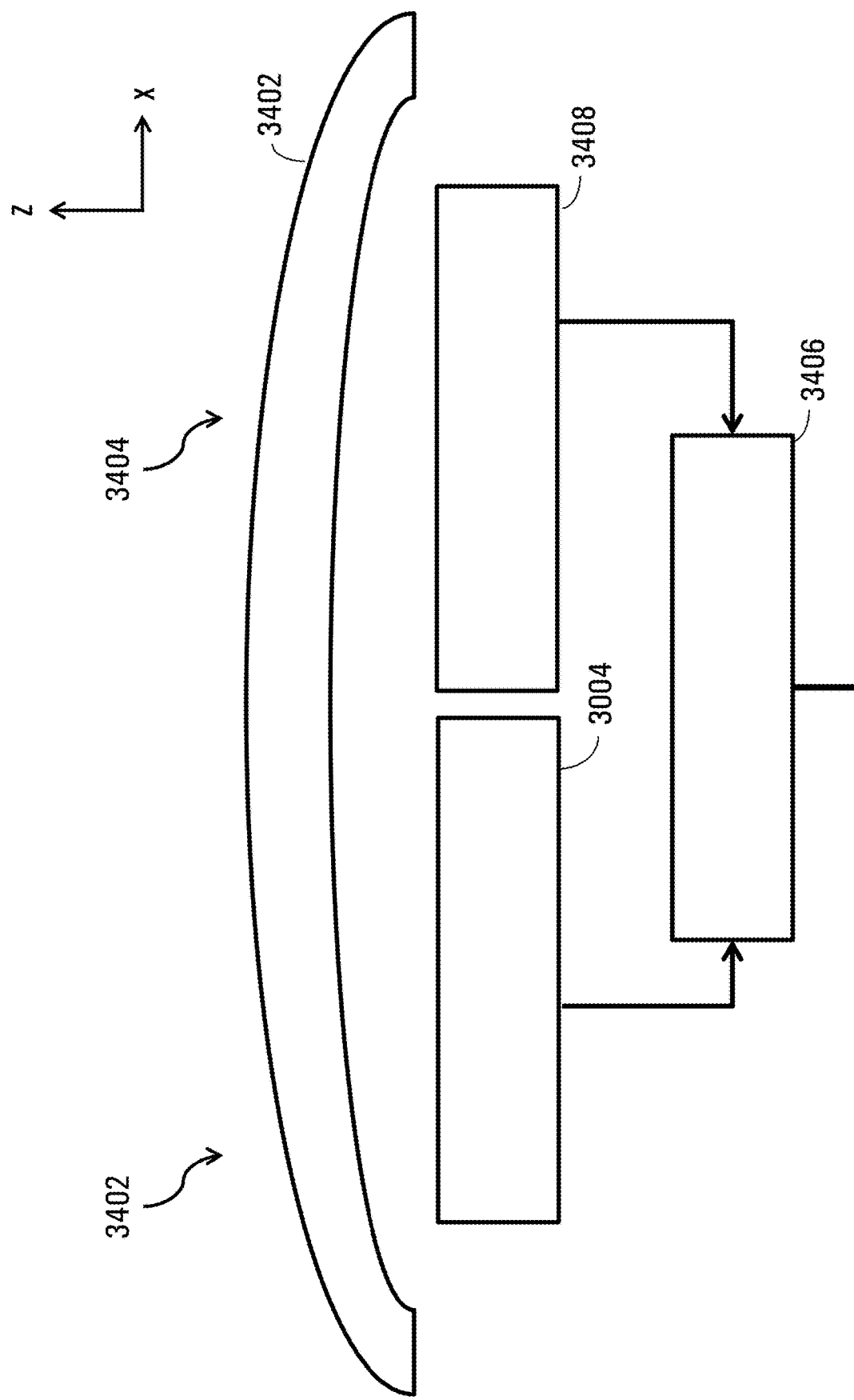
FIG. 34 shows an example of an apparatus that includes a LiDAR system and an image system that share common non-uniform magnification optics according to an embodiment of the present disclosure.

In the dual sensor system architecture of FIG. 32, the LiDAR system 3206 and the image system 3204 have separate magnification optics 3002 and 3212, respectively. FIG. 34 illustrates another example of an architecture for a dual sensor system that includes a LiDAR system 3402 and an image system 3404 that share common magnifying optics 3402 for the light sensor 3004 of the LiDAR system and the image sensor 3408 of the image system 3404. In this configuration, the three-dimensional representation of the LiDAR data and the image data captured by image sensor 3408 may be subject to the same or similar distortion from the magnifying optics 3402, and therefore registration and an eventual merge between the two data sets may be accomplished more easily.

Furthermore, an architecture like that shown in FIG. 34 may have a relatively smaller physical footprint, which may be important in applications where space is at a premium, such as in portable devices, e.g., smartphones or tablets. The merging of high resolution image data and depth data obtained through an integrated LiDAR system may have several uses in the mobile device context. For example, a higher resolution depth map resulting from merging depth data captured via the light sensor 3004 with high definition image data captured image sensor 3408 may be used for augmented reality applications, where the placement and interaction with virtual objects within an augmented reality space may rely on accurate and timely updated depth data, or in security applications where the addition of higher resolution depth data to facial recognition applications may improve device security.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Circuitry, as used herein, may be analog and/or digital, components, or one or more suitably programmed microprocessors and associated hardware and software, or hard-wired logic. Also, "components" may perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory may be electrically based or optically based.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

In case of any discrepancy, inconsistency, or other difference between terms used herein and terms used in any document incorporated by reference herein, meanings of the terms used herein are to prevail and be used.

Although various embodiments and examples have been presented, this was for purposes of describing, but should not be limiting. Various modifications and enhancements will become apparent to those of ordinary skill and are within a scope of this disclosure.

The invention claimed is:

1. A method, comprising:
capturing a first image of a scene via a first sensor;
(ii) capturing a second image of the scene via a second sensor different from the first sensor;
   wherein the first and second images overlap to include at least one common field-of-view (FoV);
   wherein the first image comprises pixels that are distributed in accordance with a non-linear image point distribution function relative to a field angle of object points of the FoV;
   wherein one of the first and second images is a depth map;
(iii) correcting the first image based on said non-linear distribution function to produce a third image; and
(iv) combining the second and third images with each other to produce a composite image including information from the second image and information from the third image.

2. The method of claim 1, wherein the image point distribution function is non-linear in the vertical direction between the horizon and the ground.

3. The method of claim 2, wherein the image point distribution function has a maximum divergence of at least ±10% compared to a linear distribution function, in the vertical direction.

4. The method of claim 2, wherein the image point distribution function is substantially linear in the horizontal direction.

5. The method of claim 1, wherein the third image has more pixels than the first image.

6. The method of claim 5, wherein some of the pixels of the third image correspond directly to pixels of the first image and wherein other ones of the pixels of the third image correspond to interpolated versions of some of the pixels of the first image.

7. The method of claim 6, further comprising interpolating said some of the pixels of the first image to produce said other ones of the pixels in the third image.

8. The method of claim 1, wherein the other one of the first and second images is a 2D camera image.

9. The method of claim 8, wherein the first sensor comprises an array of photodiodes and wherein the second sensor comprises a digital camera.

10. The method of claim 1, wherein the second image comprises pixels that are distributed in accordance with a substantially linear distribution function relative to a field angle of object points of the FoV.

11. The method of claim 1, wherein the FoV comprises a vertical FoV and a horizontal FoV.

12. The method of claim 11, wherein the vertical FoV spans at least 60 degrees and the horizontal FoV spans at least 150 degrees.

13. The method of claim 11, the image point distribution function being non-linear relative to a field angle of object points in at least the vertical FoV.

14. The method of claim 11, the image point distribution function being non-linear relative to a field angle of object points in both the horizontal FoV and the vertical FoV.

15. The method of claim 1, wherein the composite image is an RGBD image.

16. The method of claim 1, wherein the first image comprises at least one substantially compressed zone and at least one substantially expanded zone, and wherein correcting the first image comprises at least one of (i) compressing the substantially expanded zone and (ii) expanding the substantially compressed zone, to produce the third image.

17. The method of claim 1, wherein capturing the second image of the scene is carried out by sequentially capturing different subportions of the FoV as illuminated by an optical signal emitted in a controllable direction.

* * * * *